United States Patent
Odeh et al.

(10) Patent No.: US 10,829,605 B2
(45) Date of Patent: Nov. 10, 2020

(54) PROCESS AND MATERIAL FOR GROWTH OF ADSORBED COMPOUND VIA NANOSCALE-CONTROLLED RESISTIVE HEATING AND USES THEREOF

(71) Applicant: SABIC Global Technologies B.V., Bergen op Zoom (NL)

(72) Inventors: Ihab N. Odeh, Sugar Land, TX (US); Nitin Chopra, Sugar Land, TX (US); Saad Al-Hussain, Sugar Land, TX (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 168 days.

(21) Appl. No.: 15/738,910

(22) PCT Filed: Jun. 28, 2016

(86) PCT No.: PCT/US2016/039841
§ 371 (c)(1),
(2) Date: Dec. 21, 2017

(87) PCT Pub. No.: WO2017/004055
PCT Pub. Date: Jan. 5, 2017

(65) Prior Publication Data
US 2018/0186955 A1    Jul. 5, 2018

Related U.S. Application Data

(60) Provisional application No. 62/188,087, filed on Jul. 2, 2015, provisional application No. 62/355,073, filed on Jun. 27, 2016.

(51) Int. Cl.
*C08J 7/06* (2006.01)
*B32B 27/00* (2006.01)
(Continued)

(52) U.S. Cl.
CPC .............. *C08J 7/06* (2013.01); *B01J 21/08* (2013.01); *B01J 23/06* (2013.01); *B01J 23/42* (2013.01);
(Continued)

(58) Field of Classification Search
CPC ... B01J 21/08; B01J 23/06; B01J 23/42; B01J 31/06; B01J 35/0006; B01J 35/0013; B01J 35/0033; B01J 37/348
(Continued)

(56) References Cited

U.S. PATENT DOCUMENTS 5,158,654 A * 10/1992 Yoshimoto ......... B01D 53/8675
204/252
5,591,691 A * 1/1997 Friedman ............ B01J 37/0225
423/213.2
(Continued)

FOREIGN PATENT DOCUMENTS

CN    101279736    10/2008
CN    101328609    12/2008
(Continued)

OTHER PUBLICATIONS

Arafat et al., "Stress Enhanced TiO2 Nanowire Growth on Ti-6 Al-4V Particles by Thermal Oxidation," *Ceramics International*, 39(6):6517-6526, (2013).
(Continued)

*Primary Examiner* — Patricia L. Hailey
(74) *Attorney, Agent, or Firm* — Norton Rose Fulbright US LLP

(57) ABSTRACT

Disclosed is a method for making a material having supported micro- and/or nanostructures, the method includes (a) obtaining a substrate comprising a precursor material and an electrically conductive layer of micro- or nanostructures embedded into at least a portion of a first surface of the
(Continued)

substrate, and (b) applying a voltage across the electrically conductive layer to heat the micro- or nanostructures, wherein the heat converts the precursor material into micro- and/or nanostructures.

20 Claims, 20 Drawing Sheets

(51) Int. Cl.
B01J 21/08 (2006.01)
B01J 23/06 (2006.01)
B01J 23/42 (2006.01)
B01J 31/06 (2006.01)
B01J 35/00 (2006.01)
B01J 37/34 (2006.01)
C08K 3/08 (2006.01)
C08K 3/22 (2006.01)
C08K 3/36 (2006.01)
C10G 35/06 (2006.01)
B82Y 40/00 (2011.01)
H01M 2/16 (2006.01)

(52) U.S. Cl.
CPC ........... *B01J 31/06* (2013.01); *B01J 35/0006* (2013.01); *B01J 35/0013* (2013.01); *B01J 35/0033* (2013.01); *B01J 37/348* (2013.01); *B32B 27/00* (2013.01); *C08K 3/08* (2013.01); *C08K 3/22* (2013.01); *C08K 3/36* (2013.01); *C10G 35/06* (2013.01); *B82Y 40/00* (2013.01); *C08J 2369/00* (2013.01); *C08J 2379/08* (2013.01); *C08K 2003/2296* (2013.01); *C08K 2201/001* (2013.01); *C08K 2201/011* (2013.01); *C10G 2300/708* (2013.01); *H01M 2/166* (2013.01)

(58) Field of Classification Search
USPC .................. 502/300; 427/461, 532, 584, 585
See application file for complete search history.

(56) References Cited

U.S. PATENT DOCUMENTS

| | | | |
|---|---|---|---|
| 6,221,426 B1* | 4/2001 | Yamanobe | H01J 9/027 427/77 |
| 6,975,067 B2 | 12/2005 | McCormick et al. | |
| 7,217,650 B1 | 5/2007 | Ng et al. | |
| 7,354,988 B2 | 4/2008 | Charati et al. | |
| 7,497,613 B2 | 3/2009 | King et al. | |
| 7,785,415 B2 | 8/2010 | Lin et al. | |
| 8,049,333 B2 | 11/2011 | Alden et al. | |
| 8,192,809 B2 | 6/2012 | Gaitas | |
| 8,293,624 B2 | 10/2012 | Romano et al. | |
| 8,691,011 B2 | 4/2014 | Samuelson et al. | |
| 8,962,517 B2 | 2/2015 | Zurcher et al. | |
| 2004/0208988 A1* | 10/2004 | Takahashi | H05B 33/10 427/66 |
| 2005/0029498 A1 | 2/2005 | Elkovitch et al. | |
| 2006/0141168 A1* | 6/2006 | Okura | C23C 14/0021 427/569 |
| 2007/0048437 A1* | 3/2007 | Mori | H01L 51/5218 427/66 |
| 2010/0074834 A1 | 3/2010 | Kim | |
| 2011/0162870 A1 | 7/2011 | Markovich et al. | |
| 2012/0063024 A1 | 3/2012 | Mathew et al. | |
| 2012/0177808 A1 | 7/2012 | Barker et al. | |
| 2013/0008690 A1 | 1/2013 | Wiley et al. | |
| 2013/0017473 A1 | 1/2013 | Kim et al. | |
| 2013/0098436 A1 | 4/2013 | Connor et al. | |
| 2013/0158322 A1 | 6/2013 | Nyce et al. | |
| 2013/0299217 A1 | 11/2013 | Yuen et al. | |
| 2013/0341074 A1 | 12/2013 | Virkar et al. | |
| 2014/0042150 A1 | 2/2014 | Lee | |
| 2014/0085573 A1 | 3/2014 | Pellerite et al. | |
| 2014/0231718 A1 | 8/2014 | Lin et al. | |
| 2014/0235123 A1 | 8/2014 | Lin et al. | |
| 2014/0287639 A1 | 9/2014 | Lee et al. | |
| 2014/0290987 A1 | 10/2014 | Yang et al. | |
| 2014/0291287 A1 | 10/2014 | Stockum et al. | |
| 2014/0313562 A1 | 10/2014 | Ruoff et al. | |
| 2014/0338735 A1 | 11/2014 | Allemand et al. | |
| 2015/0016070 A1 | 1/2015 | Chang | |
| 2015/0028288 A1 | 1/2015 | Onicha et al. | |
| 2015/0037517 A1 | 2/2015 | Buriak et al. | |
| 2015/0053459 A1 | 2/2015 | Fried | |
| 2015/0379263 A1 | 12/2015 | Vipat et al. | |

FOREIGN PATENT DOCUMENTS

| | | |
|---|---|---|
| CN | 101338458 | 1/2009 |
| CN | 101693528 | 4/2010 |
| CN | 102553588 | 1/2014 |
| CN | 104053256 | 9/2014 |
| EP | 2830110 | 1/2015 |
| JP | 2014049262 | 3/2014 |
| WO | WO 2008/070482 | 6/2008 |
| WO | WO 2009/131713 | 10/2009 |
| WO | WO 2013/128458 | 9/2013 |
| WO | WO 2013/141274 | 9/2013 |
| WO | WO 2013/170755 | 11/2013 |

OTHER PUBLICATIONS

Bielinski et al., "Hierarchical ZnO Nanowire Growth with Tunable Orientations on Versatile Substrates Ssing Atomic Layer Deposition Seeding," *Chemistry of Materials*, 27(13):4799-4807, (2015).

Emanuela et al., "Room temperature Facile Synthesis of CuO Nanostructures by Resistive Heating," *Physica E: Low-dimensional Systems and Nanostructure*, 60:59-64, (2014).

Giolando et al., "CVD of Alumina on Carbon and Silicon Carbide Microfiber Substrates for Microelectrode Development," *Chem. Vap. Deposition*, 8(3):93-98, (2002).

International Preliminary Report on Patentability issued in International Application No. PCT/US2016/039841, dated Oct. 19, 2017.

International Search Report and Written Opinion issued in International Application No. PCT/US2016/039841, dated Oct. 17, 2016.

Kong et al. "Interlaminar Resistive Heating Behavior of Woven Carbon Fiber Composite Laminates Modified with ZnO Nanorods," *Composites Science and Technology*, 100(21):83-91, (2014).

Prokes et al., "Stress-Driven Formation of Si Nanowires," *Applied Physics Letters*, 86:193105, (2005).

Weber et al. "Silicon Nanowires: Catalytic Growth and Electrical Characterization," *Physica Status Solidi Sb*, 234(13):3340-3345, (2006).

Xu et al., "Growth and Transfer of Monolithic Horizontal ZnO Nanowire Superstructures onto Flexible Substrates," *Advanced Functional Materials*, 20(9):1493-1497, (2010).

Yang et al., "Synthesis and Fabrication of Silver Nanowires Embedded in PVP Fibers by Near-Field Electrospinning Process," *Optical Materials*, 39:118-124, (2015).

Yeo et al., "Single Nanowire Resistive Nan-heater for Highly Localized Thermo-Chemical Reactions: Localized Hierarchical Heterojunction Nanowire Growth," *Small*, 10(24):5015-5022, (2014).

* cited by examiner

Table 2

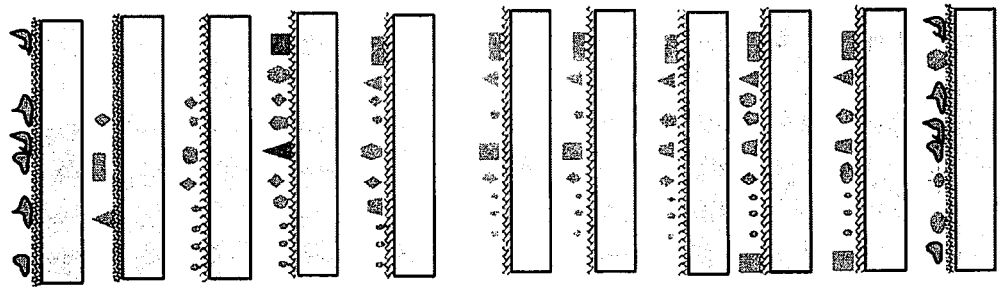

| Voltage (V) | $I_{initial}/I_{final}$ (mA) | $R_{initial}/R_{final}$ (Ω) | $R_{initial}/R_{final}$ (Ω/□) | Breakdown? | Duration (hr) |
|---|---|---|---|---|---|
| 0.6 | 0/1 | 1000/over limit | 187.5/over limit | Yes | 1 |
| 1.2 | 0/2 | 1000/783 | 187.5/146.8 | No | 1 |
| 1.8 | 0/1 | 350/over limit | 65.62/over limit | Yes | 1 |
| 2.0 | 2/2 | 745/774 | 139.7/145.1 | No | 1 |
| 2.4 | 1/2 | 260/over limit | 48.75/over limit | Yes | 1 |
| 2.5 | 3/3 | 264/1331 | 49.5/249.6 | No | 1 |
| 3.0 | 1/1 | 300/over limit | 56.3/over limit | Yes | 1 |
| 3.6 | 1/2 | 350/over limit | 65.6/over limit | Yes | 1 |
| 4.2 | 1/2 | 480/over limit | 90/over limit | Yes | 1 |
| 4.8 | 3/1 | 500/over limit | 93.8/over limit | Yes | 1 |
| 5.4 | 1/2 | 550/770 | 103.1/144.4 | No | 1 |
| 6.0 | 1/1 | 450/over limit | 84.4/over limit | Yes | 1 |

FIG. 11

Table 3

| Voltage (V) | $I_{initial}/I_{final}$ (mA) | $R_{initial}/R_{final}$ (Ω) | $R_{initial}/R_{final}$ (Ω/□) | Breakdown? | Duration (min) |
|---|---|---|---|---|---|
| 4.8 | 4/5 | 557/503 | 104.4/94.3 | No | 5 |
|  | 7/7 | 297/415 | 55.7/77.4 | No | 10 |
|  | 5/5 | 351/111 | 65.8/20.8 | No | 20 |
|  | 6/1 | 485/991 | 90.9/185.8 | No | 40 |
| 3.6 | 1/1 | 515/931 | 96.6/174.6 | No | 5 |
|  | 4/1 | 315/928 | 59.1/174 | No | 10 |
|  | 9/7 | 282/345 | 52.9/64.7 | No | 20 |
|  | 7/7 | 219/336 | 41.1/63 | No | 40 |
| 2.0 | 7/6 | 217/270 | 40.7/50.7 | No | 5 |
|  | 1/1 | 630/709 | 118.1/132.9 | No | 10 |
|  | 2/1 | 706/927 | 132.4/173.8 | No | 20 |
|  | 1/1 | 847/927 | 158.8/173.8 | No | 40 |

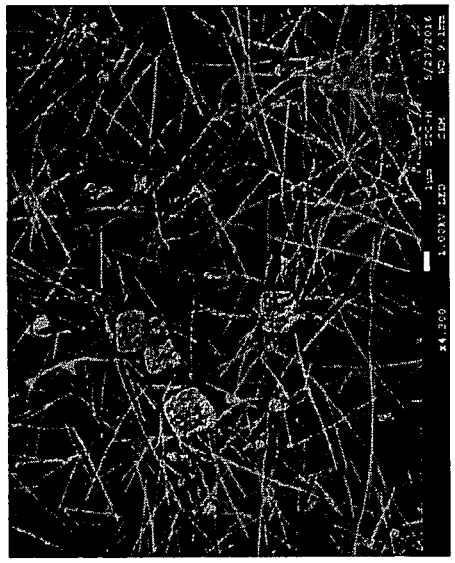
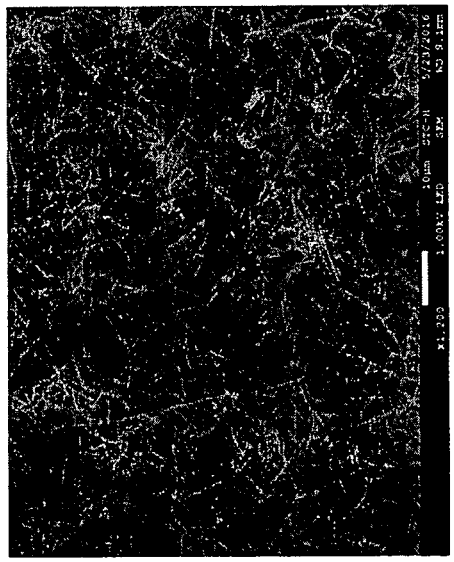
4.8 V, 10 min
FIG. 16

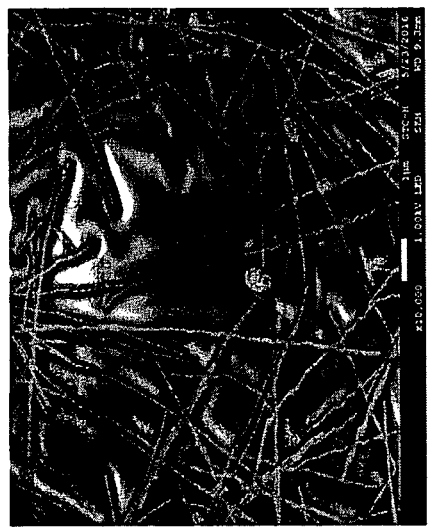
4.8 V, 20 min
FIG. 17

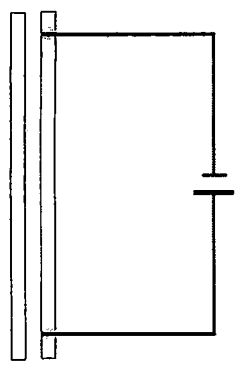
FIG. 20A
FIG. 20B
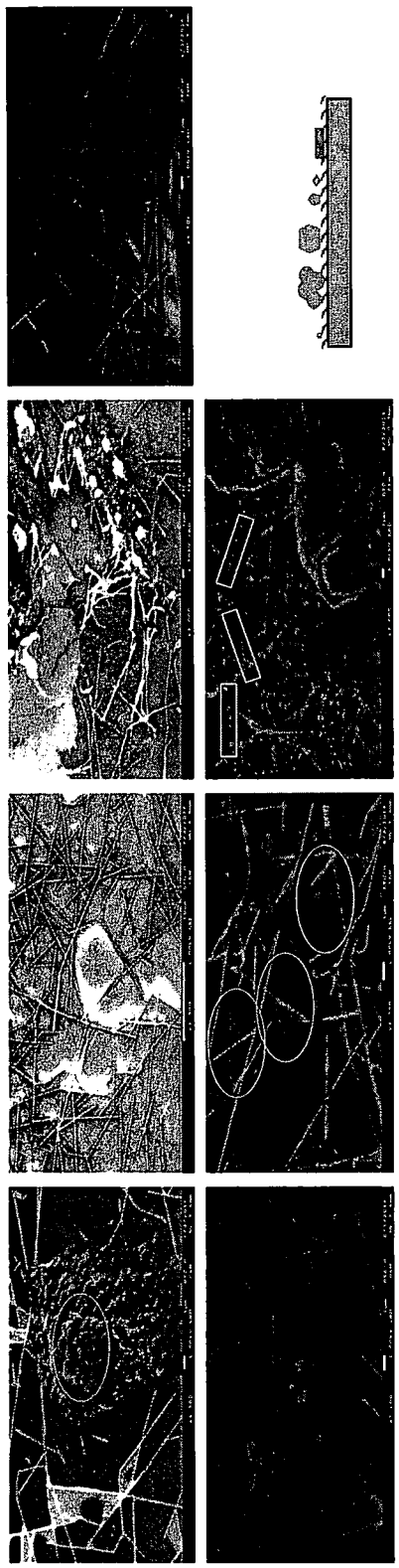
FIG. 21

PROCESS AND MATERIAL FOR GROWTH OF ADSORBED COMPOUND VIA NANOSCALE-CONTROLLED RESISTIVE HEATING AND USES THEREOF

CROSS REFERENCE TO RELATED APPLICATIONS

This application is a national phase application under 35 U.S.C. § 371 of International Application No. PCT/US2016/039841 filed Jun. 28, 2016, which claims priority to U.S. Provisional Patent Application No. 62/188,087 filed Jul. 2, 2015, and U.S. Provisional Patent Application No. 62/355,073 filed Jun. 27, 2016. The entire contents of each of the above-referenced disclosures are specifically incorporated herein by reference without disclaimer.

BACKGROUND OF THE INVENTION

A. Field of the Invention

The invention generally concerns a process for making materials having micro- or nanostructures that can be used in a wide-array of applications (e.g., chemical, electrical, optical, sensing, piezoelectrical, etc., applications). In particular, the process can include the use of resistive heating (e.g., with applied voltage) of an electrically conductive layer of micro- or nanostructures doped with, or in the presence of, a precursor material to obtain the nanostructured material. The electrically conductive layer is embedded into a substrate, thereby allowing for the creation of a material having a tuned micro- or nanostructures embedded into the substrate layer. Still further, a support material or layer can be positioned between the conductive layer and the formed layer having micro- or nanostructures.

B. Description of Related Art

Nano-based technologies are critical to present and future energy, chemical process, environmental, and electronic device industries. For instance, nanostructures (e.g., structures having dimensions below 100 nm) have great potential in catalytic applications and in electronic devices. For nanostructured catalysts, they can have higher activity and can be used at lower temperatures. However, their small size can contribute to chemical instability and a decrease in the life cycle of the catalyst. For nanostructured materials used in electronic devices, such materials can reduce the size and/or increase the operating efficiencies of the corresponding electronic devices.

Nanostructured catalysts are typically made using chemical processes (e.g., sol-gel techniques or template techniques) or deposition methods (e.g. spray pyrolysis, vapor deposition, chemical vapor deposition). These processes attempt to control the size, morphology, structure and chemical composition of the nanostructures. By way of example, U.S. Patent Application Publication No. 2013/0158322 to Nyce et al. describes growing nanowires in a polymeric template by adding a metal ion and a metal anion to a polymeric solution and allowing the solution to stand for a period of time to allow nucleation of the catalytic nanowires. Problems associated with these chemical and deposition processes include difficulties in controlling the size and shape of the resulting nanostructures.

More recently, resistive heating has been used to prepare nanostructured catalysts. In U.S. Patent Application Publication No. 2014/0042150 to Lee, for example, the use of a nanostructured resistive heating device is disclosed. The device includes a substrate having electrically conductive column-like structures that include resistive portions that are heated when voltage is applied. This device is then placed in close proximity to or in contact with a precursor material supported by a second substrate, thereby allowing the heat from the device to transform the precursor material into catalytic material. The device is then removed from the catalytic material. This process is complicated by the use of multiple materials and devices, which can increase manufacturing costs, limit the scalability and applicability of the process to small scale production, and also make it more difficult to control the size and shape of the resulting nanocatalyst domains.

Once the catalytic materials are prepared, they can then be used to catalyze a given chemical reaction. Before running the reaction, however, there is an initial start-up step, in particular reactions, where the catalytic material is heated to an appropriate temperature for the reaction to proceed. This heating step is typically performed by conventional electrically-heated plates that serve to heat the catalytic material. Generally, there is a large thermal inertia required to reach a given temperature, which results in an energy inefficient start-up process that can take many hours to complete. One of the contributing factors to this large thermal inertia is the poor thermal conductivity of typical catalytic material. The end result is a prolonged start-up procedure that requires time and relatively large amounts of energy before the chemical reaction can even begin.

After the initial start-up process is complete, the chemical reaction can then proceed. Currently, reactors are typically operated at temperatures that exceed the required temperature needed for a given reaction to take place. One of the reasons for the increased temperature is to prevent or limit coking on the surface of the catalytic material. In particular, the increased temperature can evaporate compounds from the surface of the catalyst that may lead to coking (e.g., ammonia containing compounds, carbon monoxide, and/or hydrocarbons).

SUMMARY OF THE INVENTION

A solution to the problems associated with the preparation of nanoscale and microscale materials for commercial use (e.g. catalytic material, electronic devices, optical devices, sensing devices, piezoelectrical materials, etc.) has been discovered. The solution is premised on combining (1) the use of resistive heating to produce nanostructured material directly onto an electrically conductive layer of micro- and/or nanostructures and (2) sufficient attachment of the electrically conductive layer to a substrate by embedding the conductive layer into the substrate prior to producing the catalytic material. One advantage of this process is that it can reduce the costs associated with making materials that can be used in various applications (e.g., catalysts used in chemical reactions, materials that can be incorporated into electronic devices, etc.). In particular, depositing the precursor material directly onto the embedded conductive micro- and/or nanostructures allows for a more facile production process, as the number of components needed to produce the nanostructured material is reduced. Further, the direct deposition of the precursor material onto the embedded micro- and/or nanostructures combined with localized resistive heating allows for an increased control of the nanostructure, metal particle size, and or particle/cluster size distribution. By way of example, in instances where a multi-layered catalyst is desired (e.g., bi-metallic catalysts), the processes of the present invention can be used to deposit the desired metals in a desired order to obtain a specific structure (e.g., Pt/Ni bimetallic catalysts, Pt/Co bimetallic catalysts, etc.). For instance, the metals can be evaporated/deposited onto the micro- or nanostructure in an order of A-B-A, wherein A is one metal, and B is a second metal. In general, different lattice structures, different layers, different metals or metal oxides altogether can be easily produced with the processes of the present invention.

Another advantage of the processes of the present invention is that the produced nanostructured material can be directly used in chemical reactions, electronic components, optical components, piezoelectric materials or the like without having to further process or transfer the active (e.g., metal or metal oxide) material to another substrate. By way of example, the produced material of the present invention can be directly used in a given chemical reaction (e.g., the material can simply be placed in a reaction chamber), thus allowing for the efficient loading of nanostructured catalysts in a reactor. Additional advantages of the process of the present invention include: (1) ease and scalability of making micro- or nanostructured materials for large scale manufacturing purposes; (2) reduced risk of having the micro- or nanostructured material separate or "peel off" from the substrate due to thermal expansion; (3) increased flexibility of the substrate (depending on the substrate used); (4) tunability of the type of material produced for a targeted application (e.g., a chemical reaction such as oxidative coupling of methane, water splitting, etc.) through varying the applied voltage and/or the amount of micro- or nanostructures used to make the electrically conductive layer; (5) minimal contamination due to formation of the materials from joule heating; (6) phases/stoichiometry of the micro- or nanostructured material; and/or (7) site-specific nucleation and growth of the micro- or nanostructured material.

Still further, and in instances where catalyst material is produced, the produced catalysts can provide a solution to the inefficient start-up procedures and increased temperatures used during typical chemical reactions. By way of example, the electrically conductive layer of the catalysts of the present invention can be resistively heated (e.g., application of a voltage across the conductive layer) to a temperature sufficient for the chemical reaction to begin. Without wishing to be bound by theory, the total amount of energy needed during typical start-up procedures can be reduced when compared with standard start-up procedures, as the resistive heating is localized to the particles in the conductive layer rather than heating of the entire catalytic material with conventional electrically-heated plates. In conventional commercial processing thermal evaporation is used in resistive heating processes, which also requires vacuum or low pressure. This conventional technique can result in decomposition of material in air. Thus, the current process would eliminate the need for environmental chambers for producing materials. Even further, this localized resistive heating can reduce or prevent coking by locally evaporating from the surface of the catalytic material those compounds known to cause coking (e.g., ammonia containing compounds, carbon monoxide, and/or hydrocarbons) without having to heat the entire reactor system. Thus, coking can be ameliorated with reduced energy input based, in part, on the structure of the catalysts of the present invention. This allows for chemical reactions to be operated at temperatures only needed for a given chemical reaction to proceed, rather than the higher temperatures typically used. Thus, for example, the catalysts of the present invention can allow for the cold-start for the 3-way reaction in the automobile industry (operation at much lower temperature than currently needed).

In one aspect of the invention, a method for making a micro- or nanostructured material through resistive heating is described. The method can include (a) obtaining a substrate that includes, or in the vicinity of, a precursor material and an electrically conductive layer composed of micro- and/or nanostructures embedded into at least a portion of a first surface of the substrate; and (b) applying a voltage across the electrically conductive layer to heat the micro- and/or nanostructures, and the heat converts the precursor material into micro- and/or nanostructures. In one particular non-limiting application, the precursor material can be catalytic precursor material such that conversion of the catalytic precursor material into micro- and/or nanostructures results in the production of a supported catalyst capable of catalyzing a chemical reaction—the produced micro- and/or nanostructures can be catalytic material useful in catalyzing a selected chemical reaction. The precursor material can be deposited on a surface of the micro- or nanostructures, on a surface of the substrate, or both. The precursor can include a metal or metal compound (e.g., a metal oxide, a metal nitrate, a metal hydroxide, a metal acetate, an alkyl oxide of a metal oxide, and, optionally, a support (e.g., alumina ($Al_2O_3$), silicon dioxide ($SiO_2$), titanium dioxide ($TiO_2$), or a mixture of these oxides). Examples of a support precursor material include tertiary butyl aluminum oxide, tertiary butyl aluminum hydroxide, or tetraethyl orthosilicate which can be converted upon heating to the desired $Al_2O_3$ or $SiO_2$ forms and grain sizes. If a support material is used, the precursor material can be mixed with the support material and/or deposited on the surface of the support material. The heating of the micro- or nanostructures can be controlled by modifying the amount of voltage applied across the conductive layer and/or by modifying the amount of the micro- or nanostructures used in the conductive layer (e.g., reduced amount of micro- or nanostructures can equate to reduced heating due to loss in conductivity and resistivity). Controlled heating can allow the precursor material to melt and/or grow into micro- or nanostructured particles (e.g., metal clusters) that are attached to the surface of the substrate and/or the surface of the embedded micro- or nanostructures or convert into a metal oxide. The amount of voltage can be at least 2 V to 5 V, preferably at least 4 V for at least 1 min. to 60 min., preferably 10 min. Such heating can result in the production of micro- and/or nanostructures from the precursor material that have a two-dimensional or a three-dimensional morphology. In some aspects of the invention, the amount of voltage is at least 2 V to 5 V, preferably at least 4 V for at least 1 min. to 60 min., preferably 10 min., and the heating results in the produced micro- and/or nanostructures having two-dimensional morphology. In some aspects, the precursor material can be deposited on the electrically conductive layer of at least two micro- or nanostructures embedded into at least a portion of a first surface of the substrate, where the intersection of the two micro- or nanostructures enables welding of the resulting micro- and/or nanostructures that are produced from the precursor material to the electrically conductive layer. This welding or sintering attachment architecture between the produced micro- and/or nanostructures and the electrically conductive layer can be useful in plasmonics, opto-electronics, embedded sensors, mechanical devices, membranes, curved devices, and plasmon-assisted catalysis applications.

The substrate can be a polymeric substrate, a glass substrate, a quartz substrate, or a non-electrically conductive substrate. The substrate can include an outer layer or film, and the electrically conductive layer can be attached to this outer layer or film. Alternatively, the substrate may not include an outer layer or film, and the electrically conductive layer can be attached to the outermost surface of the substrate. In either instance, the electrically conductive layer, once attached, would form the outermost layer of the substrate. The electrically conductive layer can be a plurality of micro and/or nanostructures embedded partially into the substrate. In certain aspects, the substrate is a polymeric substrate that is a flexible or an elastomeric polymeric substrate having a radius of curvature of down to 0.625 mm. The flexible, stretchable, or elastomeric polymeric substrate can include all kinds of thermoplastic polymers, blend and elastomers. Non-limiting examples of polymeric substrates include a polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide) (PPO), polypropylene (PP), polyethylene (PE), polyvinyl chloride (PVC), polystyrene (PS), polymethyl methacrylate (PMMA) and its derivatives, polyetherimide (PEI) and its derivatives, thermoplastic elastomer (TPE), terephthalic acid (TPA) elastomers, poly(cyclohexanedimethylene terephthalate) (PCT), or combinations thereof), natural rubber (NR), styrene butadiene rubber (SBR), ethylene-propylene-diene monomer (EPDM), polyurethane (PU), and poly(dimethylsiloxane) (PDMS), polyurethane, polypyrrole, single-walled carbon nanotube, poly (3-hexylthiophene), ((6,6)-phenyl-C61-butyric acid methyl ester), poly(methylmethacrylate) (PMMA), poly(3-butylthiophene), (P3BT), polyethylene naphthalate (PEN), or combinations (blends) thereof.

The conductive layer of micro- and/or nanostructures can include metal or carbon (e.g., graphene or carbon nanotubes) or are a mixture of metal micro- or nanostructures and carbon micro- or nanostructures. The conductive metal can include silver, gold, copper, nickel, platinum, palladium, chromium, tin, iron, rhodium, iridium, cobalt or any combination thereof. The conductive micro- or nanostructures can also include calcium, bismuth, magnesium, aluminum, silicon, or any combination thereof. The electrically conductive layer can be attached to the substrate such that it retains its electrical conductivity after being subjected to a peel test or a bending test. The electrically conductive layer can include a plurality of intersections between the micro- and/or nanostructures. The substrate that includes the precursor material (e.g., catalytic) and the electrically conductive layer of electrically conductive micro- or nanostructures embedded into at least a portion of a first surface of the substrate in step (a) can be obtained by: (i) depositing the electrically conductive micro- or nanostructures on at least a portion of the first surface of the substrate; (ii) applying heat to either the first surface or a second surface of the substrate, or both, with at least a first heating source or with at least a first and second heating source such that the electrically conductive micro- or nanostructures or the first surface of the substrate are heated to a temperature that is greater than the glass transition temperature or the Vicat softening temperature of the substrate and less than the melting point of the substrate; and (iii) applying a sufficient amount of pressure to either the first surface or the second surface of the substrate, or both, with at least a first pressure source or with a first and second pressure source such that the first surface of the substrate and the electrically conductive micro- or nanostructures are pressed together to form the electrically conductive layer and to embed the electrically conductive micro- or nanostructures into the first surface of the substrate. The precursor material can be deposited on the electrically conductive micro- or nanostructures or the first surface of the substrate, or both, prior to step (iii) or after step (iii) or both. In certain instances, the substrate or the electrically conductive micro- or nanostructures are heated to a temperature within at least 80% of the Vicat softening point of the substrate. In particular instances, the heating step (ii) and pressure step (iii) are performed simultaneously or substantially simultaneously. In other instances, the heating step (ii) is started before pressure step (iii) and then during heating or after sufficient heating the pressure step (iii) is performed. The heating source can be in direct contact with the electrically conductive micro- or nanostructures or in direct contact with the substrate or a combination thereof. In particular instances, the heating source directly contacts at least 10, 20, 30, 40, 50, 60, 70, 80, 90 or 100% of the deposited electrically conductive micro- or nanostructures or more particularly at least 50, 60, 70, or 80% of said micro- or nanostructures or indirectly contacts at least 10, 20, 30, 40, 50, 60, 70, 80, 90 or 100% (or preferably 50, 60, 70, or 80%) of the micro- or nanostructures that are embedded below the top surface of the substrate. By indirect, it is meant that the electrically conductive micro- or nanostructures do not directly contact the heating source but are in a sufficiently close proximity to be indirectly heated when the heating source contacts the top surface of the substrate. In some instances, the pressure source can be a roller or can be a weight applied to the second surface of the substrate such that the substrate is in between the heating source and the pressure source. In instances where the pressure source is a roller, the roller can be a metallic roller or a ceramic roller or a plastic roller or a rubber roller. The pressure applied by the roller can be a range of 25 to 300 psi or an equivalent of such pressure (e.g., a load or line pressure represented in kgf/cm) (or 50 to 250 psi or 75 to 225 psi, or 100 to 200 psi) or the speed at which the roller moves across the second surface of the substrate is at least 0.1 cm/s up to 100 cm/s (or 0.5 to 90 cm/s or 1 to 90 cm/s, or 5 to 80 cm/s, or 10 to 70 cm/s or 20 to 60 cm/s or 30 to 50 cm/s). In particular instances, the pressure applied by the roller can be 25 to 300 psi or an equivalent of such pressure (e.g., a load or line pressure represented in kgf/cm) at a speed of 0.5 to 12 cm/s or 50 to 250 psi at a speed of 1 to 10 cm/s. In some aspects, the substrate can be a non-conductive substrate, and the produced conductive material has a sheet resistance of less than 50 Ω/square, 40 Ω/square, 30 Ω/square, 20 Ω/square, or 10 Ω/square. In some instances, the precursor material (e.g., can be deposited on the electrically conductive micro- or nanostructures or the first surface of the substrate prior to step (ii), prior to step (iii), or after step (iii), by chemical vapor deposition, spray coating, ultra-sonic spray coating, roll-to-roll coating, ink-jet printing, screen printing, drop casting, spin coating, dip coating, Mayer rod coating, gravure coating, slot die coating, or doctor blade coating of a composition comprising the catalytic precursor material. In some instances, the first surface is not pre-conditioned to increase attachment between the electrically conductive micro- or nanostructures and the substrate in step (i) such that the first surface is not chemically modified or functionalized, the first surface is not physically altered such as by creating a recess in said surface, an adhesive is not used or disposed on the first surface of the substrate, or an initial pressure or heat step prior to simultaneous application of pressure and heat is not performed. In a particular instance the precursor material can be deposited on the electrically conductive micro- or nanostructures or the first surface of the substrate after step (iii) by chemical vapor deposition, metal oxide vapor deposition, plasma deposition techniques, and atomic layer deposition. In a preferred aspect, the catalytic precursor material is deposited on the electrically conductive micro- or nanostructures or the first surface of the substrate after step (iii) using vacuum sublimation. The use of vacuum can inhibit oxidation of the electrically conductive micro- or nanostructures.

In other aspects of the invention, a material that can be used in a wide array of applications (e.g., catalyst for chemical reactions, electronic devices, optical devices, sensing devices, piezoelectrical materials, etc.) is described. The material can include a substrate, an electrically conductive layer embedded into at least a portion of a first surface of the substrate, and micro- and/or nanostructures in direct contact with the substrate and/or the electrically conductive layer. In addition to the aforementioned micro- and/or nanostructures, the electrically conductive layer can itself be a layer of conductive micro- and/or nanostructures. In some instances, a support material (e.g., alumina ($Al_2O_3$), silicon dioxide ($SiO_2$), titanium dioxide ($TiO_2$) or a combination of the oxides) can be positioned between the micro- and/or nanostructures and the electrically conductive layer or the substrate. This can be done by coating the electrically conductive micro- and/or nanostructures of the electrically conductive layer (or the substrate, or both) with the support material (or deposition of the support on the electrically conductive micro- or nanostructures while resistively heating the electrically conductive micro- or nanostructure) followed by depositing precursor material onto the electrically conductive layer and/or the support material. The precursor material can then be converted into micro- and/or nanostructures via the restive heating steps described throughout the specification. The substrate can be a polymeric substrate, a glass substrate, a quartz substrate, or a non-electrically conductive substrate. The substrate can include an outer layer or film, and the electrically conductive layer can be attached to this outer layer or film. Alternatively, the substrate may not include an outer layer or film, and the electrically conductive layer can be attached to the outermost surface of the substrate. In either instance, the electrically conductive layer, once attached, would form the outermost layer of the substrate. In certain aspects, the substrate can be a polymeric substrate that is described throughout the specification. The electrically conductive metal can include silver, gold, copper, or nickel, platinum, palladium, chromium, tin, iron, rhodium, iridium, cobalt or any combination thereof. The electrically conductive micro- or nanostructures can also include calcium, bismuth, magnesium, aluminum, silicon, or any combination thereof. The electrically conductive layer can be attached to the substrate such that it retains its electrical conductivity after being subjected to a scotch tape test or a bending test. The electrically conductive layer can include a plurality of intersections or junctions between the micro- and/or nanostructures. Further, the electrically conductive layer, once attached to the substrate, could form the top or outer most layer of the substrate, where the conductive layer is embedded within the upper most or skin layer of the substrate. The electrically conductive layer can be a plurality of electrically conductive micro- or nanostructures embedded into the substrate.

In other aspects of the invention, the supported nanostructure material described herein can be used in a variety of applications (e.g., catalytic material, electronic devices, optical devices, sensing devices, piezoelectric materials, etc.). In one preferred instance, the material can be used as a catalyst to catalyze a chemical reaction. By way of example, this can include chemically reacting reactants in the presence of the material under conditions sufficient to produce a product from the reactants. Non-limiting examples of the chemical reaction that the material is capable of catalyzing can include an oxidative coupling of methane reaction, a hydrogenation reaction, a hydrocarbon cracking reaction, an alkylation reaction, a denitrogenation reaction, a desulfurization reaction, a Fischer-Tropsch reaction, a syngas production reaction, water-splitting, steam reforming of methane, selective reduction of NOx, 3-way catalytic reaction in automobiles, or any combination thereof.

In some instances, a system for catalyzing a chemical reaction is described. The system can include an inlet for a reactant feed; a reaction zone that is configured to be in fluid communication with the inlet and an outlet configured to be in fluid communication with the reaction zone and configured to remove a product stream from the reaction zone. The reaction zone can include the supported catalyst described throughout the specification. In a particular instance, the supported catalyst can be attached to a surface comprised in the reaction chamber. The surface can be a wall or a liner attached to the wall of the reaction chamber. The reactant feed, the product stream or both can be in the reaction chamber. The system can also include a collection device that is capable of collecting the product.

In yet another aspect of the present invention, an article of manufacture that includes the material of the present invention is described. The article of manufacture can include an optical film, a plasmonic substrate, a zero Possion's ratio material, a responsive polymer material, a flexible nano-device, a catalytic architecture, a controlled release media, a separation media, a membrane, an energy storage device, sensor device, medicinal or chemical delivery system, a stretchable nano-device, a stretchable sensor, a stretchable battery separator, a stretchable energy harvester, a stretchable piezoelectric devise, a stretchable transistor, a stretchable diode, or a stretchable capacitor.

Also disclosed in the context of the present invention are embodiments 1 to 58. Embodiment 1 is a method for making a supported catalyst capable of catalyzing a chemical reaction, the method comprising: (a) obtaining a substrate comprising a catalytic precursor material and an electrically conductive layer of micro- or nanostructures embedded into at least a portion of a first surface of the substrate; and (b) applying a voltage across the electrically conductive layer to heat the micro- or nanostructures, wherein the heat converts the catalytic precursor material into catalytic material. Embodiment 2 is the method of embodiment 1, wherein catalytic precursor material is deposited on a surface of the micro- or nanostructures, on a surface of the substrate, or both. Embodiment 3 is the method of any one of embodiments 1 to 2, wherein the substrate is a polymeric substrate, a glass substrate, a quartz substrate, or a non-electrically conductive substrate. Embodiment 4 is the method of embodiment 3, wherein the polymeric substrate is a flexible or elastomeric polymeric substrate. Embodiment 5 is the method of embodiment 4, wherein the flexible or elastomeric polymeric substrate is a polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide (PPO), polypropylene (PP), polyethylene (PE), polyvinyl chloride (PVC), polystyrene (PS), polymethyl methacrylate (PMMA) and its derivatives, polyetherimide (PEI) and its derivatives, thermoplastic elastomer (TPE), terephthalic acid (TPA) elastomers, poly(cyclohexanedimethylene terephthalate) (PCT), or combinations thereof. Embodiment 6 is the method of any one of embodiments 4 to 5, wherein the supported catalyst is flexible with a radius of curvature down to 0.625 mm. Embodiment 7 is the method of any one of embodiments 1 to 6, wherein the catalytic precursor material is supported by a support material, wherein the support material is alumina ($Al_2O_3$) or silicon dioxide ($SiO_2$), or titanium dioxide ($TiO2$), or a combination thereof. Embodiment 7.1 is the method of any one of embodiments 1 to 7, wherein the catalytic precursor material is supported by a support material, wherein the support material is form from a precursor material comprising tertiary butyl aluminum oxide, tertiary butyl aluminum hydroxide or tetraethyl orthosilicate. Embodiment 8 is the method of any one of embodiments 1 to 7, wherein the catalytic precursor material comprises a metal oxide, a metal nitrate, a metal hydroxide, a metal acetate, or an alkyl oxide of a metal oxide. Embodiment 9 is the method of any one of embodiments 1 to 6, wherein the catalytic precursor material is a metal oxide, a metal nitrate, a metal hydroxide, a metal acetate, an alkyl oxide of a metal oxide, or combinations thereof. Embodiment 10 is the method of any one of embodiments 1 to 9, wherein the catalytic precursor material is converted into catalytic material that is capable of catalyzing an oxidative coupling of methane reaction, a hydrogenation reaction, a hydrocarbon cracking reaction, an alkylation reaction, a denitrogenation reaction, a desulfurization reaction, a Fischer-Tropsch reaction, a syngas production reaction, or water splitting. Embodiment 11 is the method of any one of embodiments 1 to 10, wherein the catalytic precursor material is converted into catalytic material comprising a metal oxide or a metal cluster. Embodiment 12 is the method of any one of embodiments 1 to 11, wherein the micro- or nanostructures comprise metal or carbon or are a mixture of metal micro- or nanostructures and carbon micro- or nanostructures. Embodiment 13 is the method of embodiment 12, wherein the metal is a transition metal including but not limited to silver, gold, copper, or nickel, platinum, palladium, chromium, tin, iron, rhodium, iridium, cobalt or any combination thereof. Embodiment 14 is the method of any one of embodiments 12 to 13, wherein the micro- or nanostructures comprise calcium, bismuth, magnesium, aluminum and silicon. Embodiment 15 is the method of embodiment 12, wherein the carbon is graphene or carbon nanotubes. Embodiment 16 is the method of any one of embodiments 1 to 15, wherein the electrically conductive layer is attached to the substrate such that it retains its electrical conductivity after being subjected to a scotch tape test or a bending test. Embodiment 17 is the method of any one of embodiments 1 to 16, wherein the electrically conductive layer comprises a plurality of intersections between the micro- or nanostructures. Embodiment 18 is the method of any one of embodiments 1 to 17, wherein heating temperature of the micro- and/or nanostructures is controlled by modifying the amount of voltage applied across the conductive layer or by modifying the amount of a conductive filler present in the substrate. Embodiment 19 is the method of any one of embodiments 1 to 18, wherein the substrate comprising the catalytic precursor material and the electrically conductive layer of micro- or nanostructures embedded into at least a portion of a first surface of the substrate in step (a) is obtained by: (i) depositing the micro- or nanostructures on at least a portion of the first surface of the substrate; (ii) applying heat to either the first surface or a second surface of the substrate, or both, with at least a first heating source or with at least a first and second heating source such that the micro- or nanostructures or the first surface of the substrate are heated to a temperature that is greater than the glass transition temperature or the Vicat softening temperature of the substrate and less than the melting point of the substrate; and (iii) applying a sufficient amount of pressure to either the first surface or the second surface of the substrate, or both, with at least a first pressure source or with a first and second pressure source such that the first surface of the substrate and the micro- or nanostructures are pressed together to form the electrically conductive layer and to embed the micro- or nanostructures into the first surface of the substrate, wherein the catalytic precursor material is deposited on the micro- or nanostructures or the first surface of the substrate, or both, prior to step (iii) or after step (iii) or both. Embodiment 20 is the method of embodiment 19, wherein the substrate or the micro- or nanostructures are heated to a temperature within at least 80% of the Vicat softening point of the substrate. Embodiment 21 is the method of any one of embodiments 19 to 20, wherein heating step (ii) and pressure step (iii) are performed simultaneously or substantially simultaneously or wherein the heating step (ii) is performed before pressure step (iii). Embodiment 22 is the method of any one of embodiments 19 to 21, wherein the heating source comprises a heated surface that directly contacts at least 50, 60, 70, 80, 90 or 100% of micro- and/or nanostructures surfaces. Embodiment 23 is the method of any one of embodiments 10 to 22, wherein the pressure source is a roller. Embodiment 24 is the method of embodiment 23, wherein the pressure applied by the roller is between 25 to 300 psi. Embodiment 25 is the method of any one of embodiments 23 to 24, wherein the speed at which the roller moves across the second surface of the substrate is at least 0.1 cm/s up to 100 cm/s. Embodiment 26 is the method of any one of embodiments 19 to 25, wherein the catalytic precursor material is deposited on the micro- or nanostructures or the first surface of the substrate prior to step (ii) or prior to or after step (iii) by chemical vapor deposition, spray coating, ultra-sonic spray coating, roll-to-roll coating, ink-jet printing, screen printing, drop casting, spin coating, dip coating, Mayer rod coating gravure coating, slot die coating, or doctor blade coating of a composition comprising the catalytic precursor material. Embodiment 27 is the method of any one of embodiments 19 to 25, wherein the catalytic precursor material is deposited on the micro- or nanostructures or the first surface of the substrate after step (iii) by chemical vapor deposition, metal oxide vapor deposition, plasma deposition techniques, and atomic layer deposition. Embodiment 28 is the method of any one of embodiments 19 to 25, wherein the catalytic precursor material is deposited on the micro- or nanostructures or the first surface of the substrate after step (iii) by sublimation. Embodiment 29 is the method of embodiment 28, further comprising performing the sublimation under reduced pressure. Embodiment 30 is the method of any one of embodiments 19 to 29, wherein the first surface is not pre-conditioned to increase attachment between the micro- or nanostructures and the substrate in step (i) such that (a) the first surface is not chemically modified or functionalized, (b) the first surface is not physically altered such as by creating a recess in said surface, (c) an adhesive is not used or disposed on the first surface of the substrate, or (d) an initial pressure or heat step prior to simultaneous application of pressure and heat is not performed. Embodiment 31 is a supported catalyst capable of catalyzing a chemical reaction made by the process of any one of embodiments 1 to 30. Embodiment 32 is a method of catalyzing a chemical reaction, the method comprising chemically reacting reactants in the presence of the supported catalyst of embodiment 31 under conditions sufficient to produce a product from the reactants. Embodiment 33 is a supported catalyst capable of catalyzing a chemical reaction, the supported catalyst comprising a substrate comprising a catalytic material and an electrically conductive layer of micro- or nanostructures embedded into at least a portion of a first surface of the substrate, wherein the catalytic material is deposited on a surface of the micro- or nanostructures, on a surface of the substrate, or both. Embodiment 34 is the supported catalyst of embodiment 33, wherein the substrate is a polymeric substrate, a glass substrate, a quartz substrate, or a non-electrically conductive substrate. Embodiment 35 is the supported catalyst of embodiment 34, wherein the polymeric substrate is a flexible or elastomeric polymeric substrate. Embodiment 36 is the supported catalyst of embodiment 35, wherein the flexible or elastomeric polymeric substrate is a polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide (PPO), polypropylene (PP), polyethylene (PE), polyvinyl chloride (PVC), polystyrene (PS), polymethyl methacrylate (PMMA) and its derivatives, polyetherimide (PEI) and its derivatives, thermoplastic elastomer (TPE), terephthalic acid (TPA) elastomers, poly(cyclohexanedimethylene terephthalate) (PCT), or combinations thereof. Embodiment 37 is the catalyst of any one of embodiments 35 to 36, wherein the supported catalyst is flexible with a radius of curvature down to 0.625 mm. Embodiment 38 is the supported catalyst of any one of embodiments 33 to 37, wherein a support material is deposited between the electrically conductive layer of micro- or nanostructures and the catalytic material. Embodiment 39 is the supported catalyst of embodiment 38, wherein the support material is alumina ($Al_2O_3$), silicon dioxide ($SiO_2$), titanium dioxide ($TiO_2$) or a combination thereof. Embodiment 40 is the supported catalyst of any one of embodiments 33 to 39, wherein the catalytic material is capable of catalyzing an oxidative coupling of methane reaction, a hydrogenation reaction, a hydrocarbon cracking reaction, an alkylation reaction, a denitrogenation reaction, a desulfurization reaction, a Fischer-Tropsch reaction, a syngas production reaction, steam reforming of methane and hydrocarbons, selective catalytic reduction of NOx, 3-way catalytic reaction in automobiles, or water-splitting. Embodiment 41 is the supported catalyst of any one of embodiments 33 to 40, wherein the catalytic material comprises a metal cluster or a metal oxide. Embodiment 42 is the supported catalyst of any one of embodiments 33 to 41, wherein the micro- or nanostructures comprise metal or carbon or are a mixture of metal micro- or nanostructures and carbon micro- or nanostructures. Embodiment 43 is the supported catalyst of embodiment 42, wherein the metal is a transition metal including but not limited to silver, gold, copper, or nickel, platinum, palladium, chromium, tin or any combination thereof. Embodiment 44 is the method of any one of embodiments 42 to 43, wherein the micro- or nanostructures comprise bismuth, magnesium, aluminum and silicon. Embodiment 45 is the supported catalyst of embodiment 42, wherein the carbon is graphene. Embodiment 46 is the supported catalyst of any one of embodiments 33 to 45, wherein the electrically conductive layer is attached to the substrate such that it retains its electrical conductivity after being subjected to a scotch tape test or a bending test. Embodiment 47 is the supported catalyst of any one of embodiments 33 to 46, wherein the electrically conductive layer comprises a plurality of intersections between the micro- or nanostructures. Embodiment 48 is the supported catalyst of any one of embodiments 33 to 47, wherein the supported catalyst is shaped as a film having a first side and an opposing second side, wherein the first side includes the first surface. Embodiment 49 is the supported catalyst of any one of embodiments 33 to 48, wherein the supported catalyst is attached to a surface comprised in a reaction chamber. Embodiment 50 is a method of catalyzing a chemical reaction, the method comprising chemically reacting reactants in the presence of the supported catalyst of any one of embodiments 33 to 49 under conditions sufficient to produce a product from the reactants. Embodiment 51 is the method of embodiment 50, wherein the chemical reaction is an oxidative coupling of methane reaction, a hydrogenation reaction, a hydrocarbon cracking reaction, an alkylation reaction, a denitrogenation reaction, a desulfurization reaction, a Fischer-Tropsch reaction, a syngas production reaction, water-splitting, or any combination thereof. Embodiment 52 is a system for catalyzing a chemical reaction, the system comprising: an inlet for a reactant feed; a reaction zone that is configured to be in fluid communication with the inlet, wherein the reaction zone comprises the supported catalyst of any one of embodiments 33 to 49; and an outlet configured to be in fluid communication with the reaction zone and configured to remove a product stream from the reaction zone. Embodiment 53 is the system of embodiment 52, wherein the supported catalyst is attached to a surface comprised in the reaction chamber. Embodiment 54 is the system of embodiment 53, wherein the surface is a liner or a reaction chamber wall. Embodiment 55 is the system of any one of embodiments 50 to 54, wherein the reaction zone further comprises the reactant feed and the product stream. Embodiment 56 is the system of any one of embodiments 50 to 55, further comprising a collection device that is capable of collecting the product stream. Embodiment 57 is the method of any one of embodiments 1 to 30, wherein heating temperature of the electrically conductive layer of micro- and/or nanostructures is controlled by modifying the amount of voltage applied across the conductive layer or by modifying the amount of a conductive filler present in the substrate. Embodiment 58 is the method of embodiment 57, wherein the amount of voltage is at least 2 V to 5 V, preferably at least 4 V for at least 1 min. to 60 min., preferably 10 min., wherein heating results in the production of micro- and/or nanostructures having two-dimensional morphology.

"Substrate" refers to a material onto which the conductive layer is attached or embedded into. The substrate can be rigid or flexible. The substrate can be transparent, translucent, or opaque, or any degree of transparency, translucency, or opacity as desired. Non-limiting examples of rigid substrates include, for example, glass, polycarbonates, acrylics, etc. Non-limiting examples of flexible substrates include polyesters (e.g., polyethylene terephthalate, polyester naphthalate, and polycarbonate), polyolefins (e.g., linear, branched, and cyclic polyolefins), polyvinyls (e.g., polyvinyl chloride, polyvinylidene chloride, polyvinyl acetals, polystyrene, polyacrylates, etc.), cellulose ester bases (e.g., cellulose triacetate, cellulose acetate), polysulphones such as polyethersulphone, polyimides, silicones and other conventional polymeric films. Additional examples of suitable substrates can be found in, e.g., U.S. Pat. No. 6,975,067.

"Support layer" or "support material" refers to a material onto which micro- and/or nanostructures obtained from the precursor material is attached to, or dispersed in. In a preferred instance, the micro- and/or nanostructures are catalytic material capable of catalyzing a chemical reaction(s). The support layer can be porous and may include refractory oxides, porous carbon based materials, zeolites, or combinations thereof. Non-limiting examples of refractory oxides may include alumina, silica, silica-alumina, titanium oxide, zirconium oxide, magnesium oxide, or mixtures thereof. Supports may be obtained from a commercial manufacturer such as Criterion Catalysts and Technologies LP (Houston, Tex., U.S.A.). Non-limiting examples of porous carbon based materials include activated carbon and/or porous graphite. Non-limiting examples of zeolites include Y-zeolites, beta zeolites, mordenite zeolites, ZSM-5 zeolites, and ferrierite zeolites. Zeolites may be obtained from a commercial manufacturer such as Zeolyst (Valley Forge, Pa., U.S.A.).

"Adhesive" refers to material that is used to bond two adjacent layers together (e.g., conductive layer and substrate). Examples of such adhesives include acrylic resins, chlorinated olefin resins, resins of vinyl chloride-vinyl acetate copolymer, maleic acid resins, chlorinated rubber resins, cyclorubber resins, polyamide resins, cumarone indene resins, resins of ethylene-vinyl acetate copolymer, polyester resins, urethane resins, styrene resins, polysiloxanes and the like, the matrices and polymeric matrices disclosed in WO 2012/063024 and U.S. Pat. No. 8,049,333, etc.

"Electrically conductive layer" or "electrically conductive micro- and nanostructure layer" refers to a network layer that comprises nanostructures or microstructures, or both, that is capable of conducting electricity. Since conductivity is achieved by electrical charge percolating from one micro- or nanostructure to another, a sufficient amount of micro- or nanostructures should be present in the conductive layer to reach an electrical percolation threshold and become conductive. The surface conductivity of the conductive micro- or nanostructure layer is inversely proportional to its surface resistivity, sometimes referred to as sheet resistance, which can be measured by known methods in the art. The electrically conductive layer can be a stand-alone layer, or a top-most layer of an actual substrate, where this portion of the substrate is enriched in embedded conductive micro- or nanostructures.

"Nanostructure" refers to an object or material in which at least one dimension of the object or material is equal to or less than 100 nm (e.g., one dimension is 1 to 100 nm in size). In a particular aspect, the nanostructure includes at least two dimensions that are equal to or less than 100 nm (e.g., a first dimension is 1 to 100 nm in size and a second dimension is 1 to 100 nm in size). In another aspect, the nanostructure includes three dimensions that are equal to or less than 100 nm (e.g., a first dimension is 1 to 100 nm in size, a second dimension is 1 to 100 nm in size, and a third dimension is 1 to 100 nm in size). The shape of the nanostructure can be of a wire, a ribbon, a particle, a sphere, a rod, a tetrapod, a hyperbranched structure, or mixtures thereof.

"Microstructure" refers to an object or material in which at least one dimension of the object or material is equal to or less than 1000 microns and greater than 100 nm (e.g., one dimension is greater than 100 nm and less than 1000 microns in size). In a particular aspect, the microstructure includes at least two dimensions that are equal to or less than 1000 microns and greater than 100 nm (e.g., a first dimension is greater than 100 nm and less than 1000 microns in size and a second dimension is greater than 100 nm and less than 1000 microns in size). In another aspect, the microstructure includes three dimensions that are equal to or less than 1000 microns and greater than 100 nm (e.g., a first dimension is greater than 100 nm and less than 1000 microns in size, a second dimension is greater than 100 nm and less than 1000 microns in size, and a third dimension is greater than 100 nm and less than 1000 microns in size). The shape of the microstructure can be of a wire, a ribbon, a particle, a sphere, a rod, a tetrapod, a hyperbranched structure, or mixtures thereof.

"Catalyst" refers to a substance that lowers the activation energy barrier for reactants to proceed to desired products without itself undergoing any permanent chemical change. "Catalytic" means having the properties of a catalyst.

The phrase "precursor material" refers to a material that can be used to form micro- and/or nanostructures. The phrase "catalytic precursor material" refers to a material that can be used to form micro- and/or nanostructures that are catalytically active. The catalytic precursor material has less catalytic properties when compared with the formed catalytic material. The term "metal oxide precursor" refers to a material that can be converted to a metal oxide. The term "metal precursor" refers to a material that can be converted to a metal. As used herein the terms "precursor material," "catalytic precursor material," "metal oxide precursor," or metal precursor" can be used interchangeably unless specifically stated otherwise.

The term "about" or "approximately" are defined as being close to as understood by one of ordinary skill in the art. In one non-limiting embodiment, the terms are defined to be within 10%, preferably within 5%, more preferably within 1%, and most preferably within 0.5%.

The term "substantially" and its variations are defined as to includes ranges within 10%, within 5%, within 1%, or within 0.5%.

The terms "inhibiting" or "reducing" or "preventing" or "avoiding" or any variation of these terms, when used in the claims and/or the specification, includes any measurable decrease or complete inhibition to achieve a desired result.

The term "effective," as that term is used in the specification and/or claims, means adequate to accomplish a desired, expected, or intended result.

The use of the word "a" or "an" when used in conjunction with the term "comprising" in the claims or the specification may mean "one," but it is also consistent with the meaning of "one or more," "at least one," and "one or more than one."

The words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps.

The methods of the present invention can "comprise," "consist essentially of," or "consist of" particular ingredients, components, compositions, etc. disclosed throughout the specification. With respect to the transitional phase "consisting essentially of," in one non-limiting aspect, a basic and novel characteristic of the methods of the present invention are their abilities to make catalytic nanostructures by applying a voltage across an electrically conductive layer to heat micro- or nanostructures embedded into a least a portion of the surface of a substrate such that the heat converts a catalytic precursor into catalytic material.

Other objects, features and advantages of the present invention will become apparent from the following figures, detailed description, and examples. It should be understood, however, that the figures, detailed description, and examples, while indicating specific embodiments of the invention, are given by way of illustration only and are not meant to be limiting. Additionally, it is contemplated that changes and modifications within the spirit and scope of the invention will become apparent to those skilled in the art from this detailed description. In further embodiments, features from specific embodiments may be combined with features from other embodiments. For example, features from one embodiment may be combined with features from any of the other embodiments. In further embodiments, additional features may be added to the specific embodiments described herein.

BRIEF DESCRIPTION OF THE DRAWINGS

Advantages of the present invention may become apparent to those skilled in the art with the benefit of the following detailed description and upon reference to the accompanying drawings.

FIG. 11 shows includes Table 2, which lists the conditions for forming the nanostructures from zinc acetate at a 1 hour duration time period, and a schematic of the types of nanostructures formed.

FIGS. 16 and 17 show the growth of the zinc oxide nanostructures through decomposition of the zinc acetate precursor at 4.8 V for 10 min. and 20 min, respectively.

FIG. 20A shows a schematic of a control sample for a peel test.

FIG. 20B shows a schematic of a sample that was joule heated under the following conditions: 4.8 V, $I_{initial}$=1 mA, $I_{final}$=1 mA, $R_{initial}$=984 Ω, $R_{final}$=984 Ω t=20 mints; where only the bottom layer was subjected to DC voltage; after drying, the sample was peeled.

FIG. 21 shows SEM images of the zinc oxide nanostructures in polycarbonate films after joule heating at 3.6 V, and 20 minutes and a schematic of the formed nanostructures.

Figures 1, 1A:
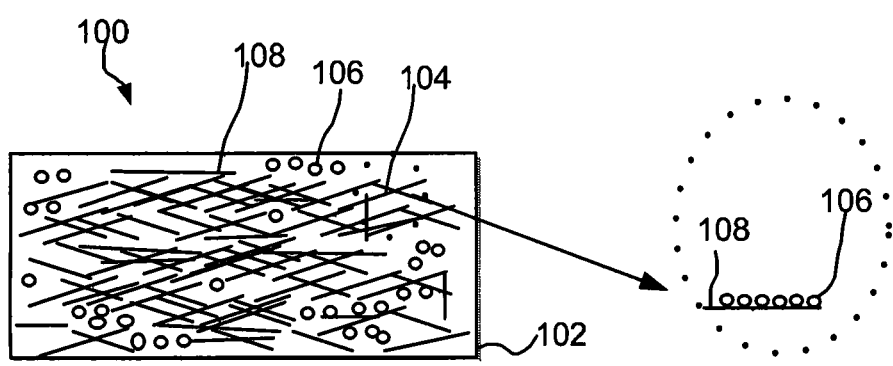
FIG. 1 is a schematic of the support catalyst of the present invention.
FIG. 1A is an enlargement of the nanostructure with the catalyst of FIG. 1.

While the invention is susceptible to various modifications and alternative forms, specific embodiments thereof are shown by way of example in the drawings and may herein be described in detail. The drawings may not be to scale.

DETAILED DESCRIPTION OF THE INVENTION

While nanostructures having catalytic, electronic, and/or optical properties are promising for various applications due to their high surface area, there are a number of challenges associated with their use. By way of example, preparation of a catalyst, catalyst life and activity, transportation of the catalyst, catalyst dispersability, loading of the catalyst in a reactor, or combinations thereof can be challenging. As discussed above, while there have been attempts to address the problems associated with preparation of micro- or nanoscale nanostructured materials (e.g., catalysts) via chemical processes (e.g., sol-gel techniques or template techniques), deposition methods (e.g., spray pyrolysis, vapor deposition, chemical vapor deposition), or resistive heating methods utilizing a separate heating device, these processes can be costly, time-consuming, and potentially detrimental to the resulting nanostructured material.

The present invention offers a solution to these current problems. The solution is premised on the use of resistive heating to produce nanostructured material (e.g., catalytic material) directly onto an electrically conductive layer of electrically conductive micro- and/or nanostructures. The electrically conductive layer is embedded into a substrate to ensure sufficient attachment to the substrate and to reduce or prevent thermal expansion and ultimately separation of the conductive layer/nanostructured (e.g., catalytic) material combination from the substrate. This set-up allows for the direct production of a nanostructured material (e.g., catalyst) through resistive heating. Furthermore, when the nanostructured material is a catalyst, efficient loading of the catalyst in a reactor (e.g., the catalyst, once produced, can simply be placed inside a chemical reactor, attached to the wall of a chemical reactor, etc.) can be achieved.

These and other non-limiting aspects of the present invention are discussed in further detail in the following sections with reference to the Figures.

A. Supported Nanostructured Material

Referring to FIG. 1 perspective view of a supported nanostructured (e.g., catalyst) material is depicted. The supported catalyst material 100 can include a substrate 102, electrically conductive layer 104, and nanostructured (e.g., catalytic) material 106, and electrically conductive nanostructures 108. The electrically conductive layer 104 can be formed by the attachment of electrically conductive micro- or nanostructures 108 in at least a portion of a first surface of substrate 102. Notably, electrically conductive micro- or nanostructures 108 are embedded in at least a portion of the substrate 102 surface such that a portion of the micro- or nanostructures 108 are above the surface of the substrate. The catalytic material 106 can be deposited on the surface of the micro- or nanostructures 108 as shown in FIG. 1A, which is an enlargement of the surface of the electrically conductive layer 104. In some embodiments, the catalytic material 106 is embedded in at least a portion of the substrate 102 or deposited on the surface of the substrate. The supported catalyst material 100 can be flexible or rigid. The supported catalyst material can be produced as a sheet, a film, or a thin film, and have a thickness of 0.1 mm to 10 centimeters (cm). In a particular aspect, the supported catalyst material 100 is flexible and has a radius of curvature down to 0.625 mm.

B. Processes to Make the Supported Nanostructure Material

Figure 2:
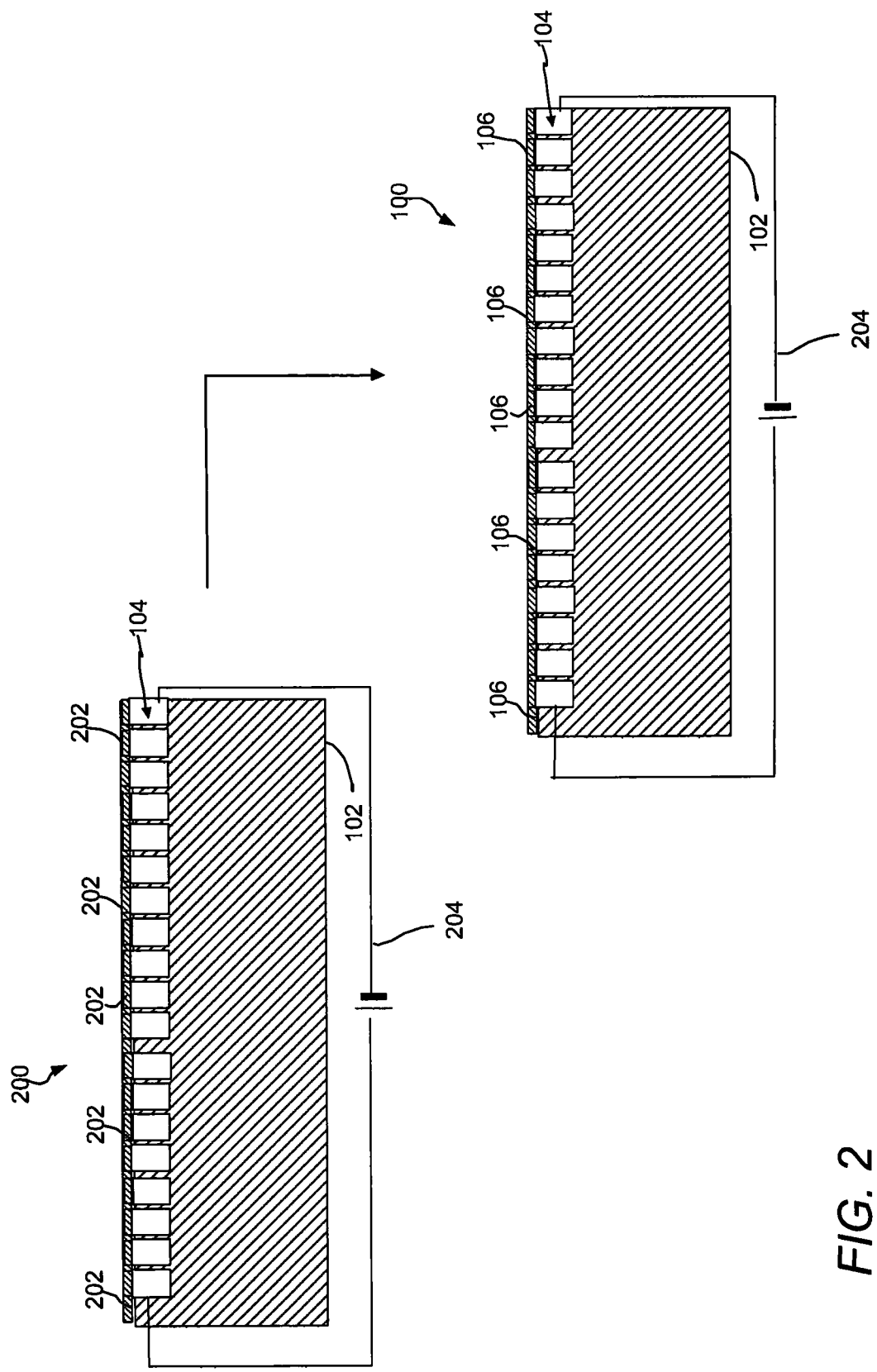
FIG. 2 is schematic of a method to make the supported catalyst of the present invention.

The supported nanostructured (e.g., catalyst) material can be fabricated by obtaining a supported precursor article. The supported precursor article can include a substrate that includes a precursor material and the electrically conductive layer of micro- or nanostructures. FIG. 2 is a schematic of a method to fabricate the supported nanostructured material (e.g., catalyst). In FIG. 2, a supported precursor article 200 includes substrate 102, precursor material 202, and electrically conductive layer 104 of micro- or nanostructures 108. In some embodiments, the precursor material 202 is deposited on the substrate and the electrically conductive layer 104 of electrically conductive micro- or nanostructures. The substrate 102 can be connected with an electrical source 204 in a manner known in the art to supply voltage to the electrical conductive layer 104 of micro- or nanostructures. By way of example, voltage of 0.5 to 10 V or 2 V to 5 V, or 2 V, 2.5 V, 3.5 V, 4.5 V, 5.0 V, 5.5 V, 6.0 V, 6.5 V, 7.0 V, 7.5 V, 8.0 V, 9.0 V, 9.5 V, 10.0 V, preferably 4.5 V can be applied to the electrically conductive layer. The power supply electrically excites the electrically conductive materials such that current flows between the electrically conductive micro- or nanostructures. The current resistively heats at least a portion of the substrate 102 and/or the catalyst precursor material 202. Heat can transfer to the catalyst precursor material 202 or the substrate 102 by conduction and/or radiative heat transfer, and convert the catalytic precursor material 202 to catalytic material 106. The amount of heat can be controlled by controlling the amount of voltage applied across the conductive layer. In some embodiments, the heat is sufficient to convert a metal precursor to a metal oxide. For example, an average temperature ranging from 200° C. to 1000° C., 450° C. to 750° C., 500° C. to 600° C., or any range or temperature there between. In certain aspects, the heat is sufficient to melt the precursor material to form a liquid or semi-liquid material. Nanostructures (e.g., catalytic nanoparticles or nanostructures) can grow from the precursor material after drying and removal of the carrier liquid, and after application of the voltage across the conductive layer, upon cooling of the substrate 102. The growth of the nanostructures (e.g., nanocrystals) can be controlled by the amount of heat, the rate of heating/cooling, and/or varying the rate of change of heating/cooling provided by electrically conductive layer 104. The ability to control the heat applied to the catalytic precursor promotes more consistent growth of the catalytic precursor material into catalytic nanoparticles. In certain aspects and as demonstrated in the Examples, applying voltage of 2 V or more, or 2 V, 3 V, 4 V, 5 V, or 4.5 V or more for sufficient time (e.g., 1 minute to 10 minutes, or 1, 2, 3, 4, 5, 6, 7, 8, 9, 10 min.) can result in formation two-dimensional (2D) layered morphologies (e.g., 2D flakes from zinc acetate).

In some aspects, salt decomposition into nanostructures at the junction points of the electrically conductive micro- or nanostructures (e.g., Ag nanowire mesh) can result into welding of the junction and/or particles or nanostructures via the precursor decomposition at the junction. Such a welding can be used in forming architectures for plasmonics, optoelectronics, embedded sensors, mechanical devices, membranes, curved devices, and plasmon-assisted catalysis applications. In other aspects, the shape of the nanostructures formed from the heating the precursor material can be driven by the orientation and spacing of the electrically conductive micro- or nanostructures, or by the shape defined by the spacing. Without wishing to be bound by theory, it is believed that the orientation of the electrically conductive micro- or nanostructures can result in a temperature gradient that directs the growth of the nanostructured material into particles, crystals, facets, or the like. In some aspects, the shape of the nanostructured material can be determined by meniscus formation of the precursor solution droplet between the electrically conductive micro- or nanostructures and the specific shape of the region between the electrically conductive micro- or nanostructures. By way of example, if two meet at a junction (intersect) and a precursor salt droplet forms a triangle via a wicking mechanism, then such a droplet converts upon joule heating to micro- or nanostructures having shapes such as triangle, trapezoid, square, or rectangle. If more than two nanowires meet then the resulting micro- or nanostructure can be multi-faceted or with more than four facets (e.g., 4, 5, 6, 7, 8, 9, 10, 11, 12, 13, 14, or more facets).

C. Materials

1. Substrate Material

The substrate material can include a polymeric substrate, a glass substrate, a quartz substrate or a non-electrically conductive substrate. The polymeric substrate can be any polymeric substrate for example, a flexible, elastomeric, or stretchable polymeric substrate. Polymeric substrates can include thermoset polymers, thermoplastic, elastomeric or combinations thereof. Non-limiting examples of polymeric substrates include polyethylene terephthalate (PET), a polycarbonate (PC) family of polymers, polybutylene terephthalate (PBT), poly(1,4-cyclohexylidene cyclohexane-1,4-dicarboxylate) (PCCD), glycol modified polycyclohexyl terephthalate (PCTG), poly(phenylene oxide (PPO), polypropylene (PP), polyethylene (PE), polyvinyl chloride (PVC), polystyrene (PS), polymethyl methacrylates (PMMA) and its derivatives, polyetherimide (PEI) and its derivatives, thermoplastic elastomer (TPE), terephthalic acid (TPA) elastomers, poly(cyclohexanedimethylene terephthalate) (PCT), polyethylene naphthalate (PEN), polyamide (PA), polystyrene sulfonate (PSS), polyether ether ketone (PEEK) or combinations or blends thereof. Polymeric substrates are commercially available. A non-limiting example of a commercial supplier is SABIC Innovative Plastics (USA) and DuPont™ (USA). In particular instances, the substrate can be a polyethylene terephthalate (PET). In some embodiments, the polymeric material is a blend of materials that produces a stretchable polymeric material. Non-limiting examples of materials that can be used for stretchable polymeric material include natural rubber (NR), styrene butadiene rubber (SBR), ethylene-propylene-diene monomer (EPDM), polyurethane (PU), and poly(dimethylsiloxane) (PDMS), polyurethane, polypyrrole, single-walled carbon nanotube, poly(3-hexylthiophene), ((6,6)-phenyl-C61-butyric acid methyl ester), poly(methylmethacrylate) (PMMA), poly(3-butylthiophene), (P3BT), polyethylene naphthalate (PEN), or combinations (blends) thereof, or in combination with the other polymers listed above.

2. Electrically Conductive Layer

The electrically conductive micro- or nanostructures can include or be made of metal or carbon or can be mixtures of metal and carbon. Non-limiting examples of metal include silver, gold, copper, or nickel, platinum, palladium, chromium, tin or any combination thereof. The electrically conductive micro- or nanostructures can also include aluminum, bismuth, magnesium, silicon or any combination thereof. A non-limiting example of carbon includes graphene. A non-limiting example of electrically conductive micro- or nanostructures includes silver nano wires (AgNW). The micro- or nanostructures can have widths of less than 100, 90, 80, 70, 60, 50, 40, 30, 20, or 10 nm and aspect ratios of 1, 5, 10, 20, 30, 40, 50, or greater. In some aspects, the micro- or nanostructures are a mesh of wires. The conductive layer of the resulting conductive material can have a roughness of 20 to 200 nm peak to peak or a 10 to 50 nm rms roughness. The conductive layer can have a thickness between 20 nm to 20 µm and can cover at least 1, 5, 10, 20, 30, 40, 50, 60, 70, 80, 90, or 100% of the first surface of the substrate. The conductive layer can have a predefined pattern. The electrically conductive micro- or nanostructures can have a length that provides suitable resistance, for example, a length of 100 micron or less. The electrically conductive layer can be attached to the substrate using known nanostructure techniques. In a preferred instance the electrically conductive layer is combined with the substrate as described throughout the specification. In some embodiments, the methods described in U.S. Patent Application Publication No. 2015/0037517 to Odeh et al. for the preparation of electrical components and electrodes, which is incorporated in herein by reference in its entirety, can be used to form the electrically conductive layer on the substrate material.

3. Nanostructured Material

The nanostructured material can be a plurality of micro- and/or nanostructures, preferably nanostructures. The nanostructure material can be any catalytic material, metal, metal oxide, metal alloy used for the desired application. The nanostructured material can include one or more metals or a compound thereof (e.g., a metal cluster or a metal oxide). The nanostructured material can have catalytic properties for a desired chemical reaction. When used as a catalyst, an amount of catalytic metal depends, inter alia, on the catalytic activity of the catalytic material. The amount can range from 0.00001 to 100 wt. %, from 0.01 to 10 wt. %, 0.1 to 5 wt. %, or 1 to 3 wt. %, based on the total weight of catalyst. The nanostructured material can include one or more metals or metal compounds from Columns 1, 2 and 4-15, lanthanides, and/or actinides, or any combination thereof. Non-limiting examples, of Columns 1 and 2 metals include lithium (Li), sodium (Na), potassium (K), rubidium (Rb), cesium (Cs), magnesium (Mg), calcium (Ca), barium (Ba) and strontium (Sr). Column 4 metals include, but are not limited to titanium (Ti) and zirconium (Zr). Non-limiting examples of Column 5 metals include vanadium (V). Non-limiting examples of Column 6 metals include molybdenum (Mo) and tungsten (W). Column 7 metals include, but are not limited to, manganese (Mn) and rhenium (Re). Non-limiting examples of Columns 8-10 metals include iron (Fe), ruthenium (Ru), cobalt (Co), rhodium (Rh), nickel (Ni), palladium (Pd), and platinum (Pt). Non-limiting examples of Columns 11-12 metals include copper (Cu), silver (Ag), gold (Au), and zinc (Zn). Columns 13-15 metals include, but are not limited to, aluminum (Al), gallium (Ga), indium (In), thallium (Tl), silicon (Si), germanium (Ge), tin (Sn), lead (Pb), arsenic (As), antimony (Sb), and bismuth (Bi). Lanthanides include lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and lutetium (Lu). Actinides include actinium (Ac), thorium (Th), protactinium (Pa), uranium (U), neptunium (Np), plutonium (Pu), americium (Am), curium (Cm), berkelium (Bk), californium (Cf), einsteinium (Es), fermium (Fm), mendelevium (Md), nobelium (No), and lawrencium (Lr).

4. Precursor Material

The nanostructured (e.g., catalytic) precursor is capable, when heated, to transform or convert to the nanostructured (e.g., catalytic) material. The metal or metal compounds can be obtained commercially or prepared through known synthetic methods. Commercial suppliers of metals and metal compounds include Sigma Aldrich® (USA), BASF (Germany), Shepard Chemical Co. (USA), Advanced Chemicals Supplier (USA), etc. Non-limiting examples of metal compounds that can be used as catalytic precursor material include metal oxides, mixed metal oxides, metal hydrated oxides, metal oxyhydroxides, metal hydroxides, metal oxycarbonates (or metal oxide carbonates), metal carbonates, metal sulfates, metal oxalates, metal nitrates, metal acetates, alkyl oxides of the above listed metals (e.g., secondary alkoxides, tertiary alkoxides), or any combination thereof. When heated, these compounds can be converted to metal clusters or metal oxides of the nanostructured (e.g., catalytic) metals described throughout the specification.

In some embodiments, the precursor material (e.g., catalytic precursor material) can include a support material or a carrier. The support material is porous and has a high surface area. In some embodiments, the support is active (i.e., has catalytic activity). The support can be an inorganic oxide. In one aspect, the support precursor can be tertiary butyl aluminum oxide or tertiary butyl aluminum hydroxide that can be transformed into $Al_2O_3$ or tetraethyl orthosilicate that can be transformed into $SiO_2$. In some embodiments, the support comprises an inorganic oxide, alpha, beta, gamma, or theta alumina ($Al_2O_3$), activated $Al_2O_3$, silicon dioxide ($SiO_2$), titanium dioxide ($TiO_2$), magnesium oxide (MgO), calcium oxide (CaO), strontium oxide (SrO), zirconium oxide ($ZrO_2$), zinc oxide (ZnO), lithium aluminum oxide ($LiAlO_2$), magnesium aluminum oxide ($MgAlO_4$), manganese oxides (MnO, $MnO_2$, $Mn_2O_4$), lanthanum oxide ($La_2O_3$), activated carbon, silica gel, zeolites, activated clays, silicon carbide (SiC), diatomaceous earth, magnesia, aluminosilicates, calcium aluminate, or combinations thereof. In some embodiments, the support comprises $SiO_2$, $Al_2O_3$, or both. In still other embodiments, the support material can include a carbonate. For example, $MgCO_3$, $CaCO_3$, $SrCO_3$, $BaCO_3$, $Y_2(CO_3)_3$, $La_2(CO_3)_3$, or combination thereof. All of the support materials can be purchased or be made by processes known to those of ordinary skill in the art (e.g., precipitation/co-precipitation, sol-gel, templates/surface derivatized metal oxides synthesis, solid-state synthesis, of mixed metal oxides, microemulsion technique, solvothermal, sonochemical, combustion synthesis, chemical vapor deposition, etc.).

The amount of metal on the support material depends, inter alia, on the given application of the resulting end product or material (e.g., catalyst for a chemical reaction). In some embodiments, the amount of metal present on the support ranges from 1 to 100 parts by weight of catalyst per 100 parts by weight of support or from 10 to 50 parts by weight of catalyst per 100 parts by weight of support. In other embodiments, the amount of metal present on the support ranges from 100-200 parts of catalyst per 100 parts by weight of support, or 200-500 parts of catalyst per 100 parts by weight of support, or 500-1000 parts of catalyst per 100 parts by weight of support material.

In some instances when a catalyst is being prepared, support material can be blended with the catalytic (nanostructure) material to make the catalytic (nanostructure) precursor material. The catalytic precursor can then be deposited on the electrically conductive micro- or nanostructures, and/or the substrate as described throughout the specification. In other instances, the support material can first be added to the electrically conductive micro- or nanostructures and/or the substrate. The catalytic precursor material can then be added to the support material as described throughout the specification.

The precursor material can include one or more dopants. The dopant can be a chemical compound that is added to or incorporated into the material, the precursor material, and/or the support material or combinations thereof to optimize the performance of the end product (e.g., if a catalyst is prepared, the dopant can increase or decrease the activity of the catalyst). With respect to catalysts, a doped catalyst may increase or decrease the selectivity, conversion, and/or yield of a reaction catalyzed by the catalyst when compared with an identical catalyst that does not include a dopant(s). Dopants which increase catalytic activity are referred to as "promoters" while dopants which decrease catalytic activity are referred to as "poisons". Dopants may alter, or provide a tunability control, that can alter the catalytic activity and selectivity of the reactions of interest. The dopant may be present in the catalyst in any form and may be derived from any suitable source of the element (e.g., chlorides, bromides, iodides, nitrates, oxynitrates, oxyhalides, acetates, formates, hydroxides, carbonates, phosphates, sulfates, amines, imines, alkoxides, and the like.) The dopant can be a metal or metal compound listed above, phosphorous or any combination thereof. Some of these compounds form undesirably due to environmental conditions in the surroundings, or as a byproduct of certain reactions. Non-limiting examples of dopants include P, Na, Mg, Ca, Sr, Ga, Sc, Y, Zr, In, Nd, Eu, Sm, Ce, Gd, Hf, Ho, Tm, W, La, K, Dy, Cs, S, Zn, Rb, Ba, Yb, Ni, Lu, Ta, P, Pt, Bi, Sn, Nb, Sb, Ge, Ag, Au, Pb, Re, Fe, Al, Tl, Pr, Co, Rh, Ti, V, Cr, Mn, Ir, As, Li, Tb, Er, Te or Mo.

D. Process of Preparing the Supported Precursor Material

As discussed above, the supported precursor material (e.g., supported catalyst precursor material) can include the substrate, an electrically conductive layer of electrically conductive micro- or nanostructures, and the precursor material. The materials to make the supported precursor material can be obtained commercially or be fabricated. Methods to prepare the supported catalyst precursor material are described in the sections below.

1. Deposition of Micro- or Nanostructures on the Substrate

The electrically conductive micro- or nanostructures can be deposited on at least a portion of the first surface of the substrate. Heat can be applied to either the first surface or a second surface of the substrate, or both, with at least a first heating source or with at least a first and second heating source such that the micro- or nanostructures or the first surface of the substrate are heated to a temperature that is greater than the glass transition temperature or the Vicat softening temperature of the substrate and less than the melting point of the substrate. A sufficient amount of pressure to either the first surface or the second surface of the substrate, or both, with at least a first pressure source or with a first and second pressure source such that the first surface of the substrate and the electrically conductive micro- or nanostructures are pressed together to form the electrically conductive layer and to embed the micro- or nanostructures into the first surface of the substrate. The precursor material can be deposited on the micro- or nanostructures or the first surface of the substrate, or both, prior to and/or after applying a sufficient amount of pressure to the first and/or second surfaces of the substrate. The electrically conductive micro- or nanostructures can be deposited on the surface of the substrate by spray coating, ultra-sonic spray coating, roll-to-roll coating, ink-jet printing, screen printing, drop casting, spin coating, dip coating, Mayer rod coating, gravure coating, slot die coating, or doctor blade coating of a composition comprising the micro- or nanostructures.

Figure 3:
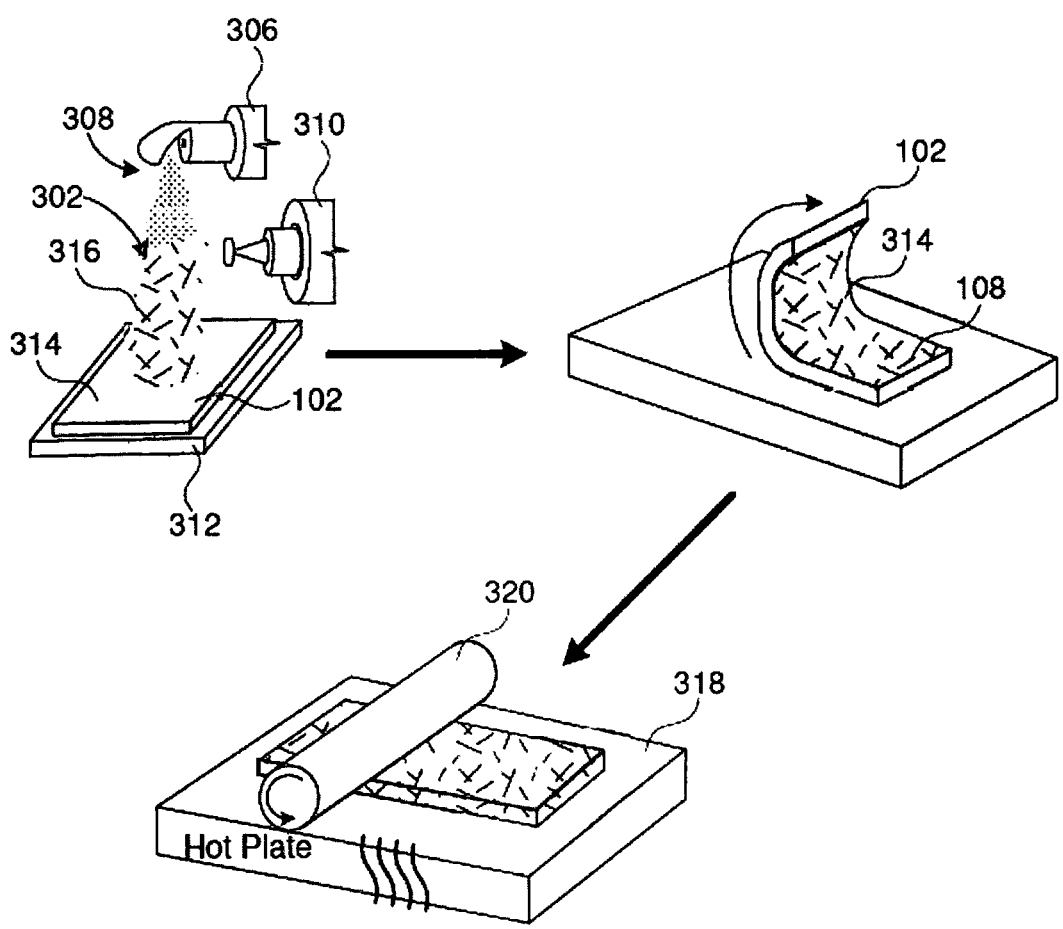
FIG. 3 is schematic of a method to make an electrically conductive layer having micro- or nanostructures embedded in at least a portion of the surface of a substrate of the present invention.

FIG. 3 illustrates in a non-limiting way the process by which the electrically conductive micro- or nanostructures (e.g., nanowires) are sprayed onto a substrate such as PET, and then further processed with simultaneous application of heat and pressure to form a mesh. Referring to FIG. 3, an ultra-sonic spray coating system (such as the Sono-Tek ExactaCoat$^{sc}$ system) can be used spray a micro- or nanostructure composition 302 (or a composition that includes a mixture of microstructures and nanostructures or at least two compositions, in which the first includes microstructures and the second includes nanostructures) onto the substrate 102. The ultra-sonic spray system has an air nozzle 306 that produces an air stream 308 and a spray nozzle 310 that sprays a micro or a nanostructure composition 302 on the first surface of a substrate 102 via the air stream 308. The substrate 308 can be positioned on structure 312 (e.g., any structure can be used so long as it physically holds (supports) the substrate as it is being sprayed with the micro- or nanostructure composition 302. As discussed above, however, other methods of disposing the micro- or nanostructure composition 302 onto the substrate 102 are contemplated (e.g., spray coating, role-to-role coating, ink-jet printing, screen printing, drop casting, spin coating, dip coating, Mayer rod coating, doctor blade coating, etc.). The amount of the electrically conductive micro- or nanostructure composition 302 disposed onto the substrate surface 314 can be adjusted via the air nozzle 306 and spray nozzle 310, which can be used to tune or select a given property of the conductive micro- or nanostructure layer. Additionally, the sheet resistance of the resulting layer can be tuned by any one of or any combination of the following parameters: (a) varying the amount of the micro- or nanostructure composition 302 deposited on the substrate surface 314; (b) varying the amount of pressure used (e.g., varying the roller pressure); (c) varying the temperature/heat; and/or (d) varying the micro- or nanostructure type or types being used. The micro- or nanostructure composition 302 can include micro- or nanostructures and/or the support material dispersed or dissolved in a liquid medium or solvent (e.g., aqueous solvents, alcohols, polar hydrocarbons, chlorinated solvents, or combinations thereof). In order to increase the dispersability or solubility of the micro- or nanostructures 108 in the liquid medium or solvent, the micro- or nanostructures 108 can be coated with an organic polymeric ligand that includes, for example, a thiol, a phosphorus, or an amine group or combinations thereof (e.g., polyvinylpyrrolidone or polyphenylene vinylene or a combination thereof). In a non-limiting example, the micro- or nanostructure composition 302 can be made by mixing desired microstructure or nanostructures or both and the support material (e.g., refractory oxide) with the liquid medium.

After the micro- or nanostructure composition 302 is disposed on the substrate surface 314 the composition 302 can be allowed to dry to remove the liquid or solvent material, such as by air drying or heat drying. Drying can be carried out quickly (e.g., less than 1 minute), to avoid re-dissolving the micro- or nanostructure 108. This may be done in-situ, for example, by applying heat from the structure 312 or as a secondary process. Alternatively, and if so desired, one can choose to skip such a drying step. The substrate 102 having the micro- or nanostructures 108 can then be flipped over to have the micro- or nanostructure come into direct contact with a heat source 318. In the FIG. 3 embodiment, the substrate 102 is transparent, thus the micro- or nanostructures 108 are seen through the substrate. The heat source 318 directly contacts the disposed micro- or nanostructures 108 such that the micro- or nanostructures are in between the heat source 318 and the surface 314. However, in other aspects, the heat source 318 can directly contact both the micro- or nanostructures and the surface 314 of the substrate 102. The heat source 318 can be any heat source that is capable of directly (e.g., direct contact with the substrate's surface) or indirectly (e.g., through contact with the micro- and/or nanostructures 108) heating the entire surface area of the substrate 102. By having a stationary heat source 318, application of a pressure source 320 on the opposite side of the substrate 102 can be used, thereby providing for simultaneous application of heat and pressure to the micro- or nanostructures. While the heat source 318 can be "turned on" at any point in the process, it is the application of both heat and pressure at the same time that allows for sufficient attachment of the micro- or nanostructures 108 to the substrate 102. The heat source 318 can be used to heat the micro- or nanostructures 108 or the surface of the substrate 102 that is carrying the nanostructures 108 to a temperature that is greater than the glass transition temperature or the Vicat softening temperature of the substrate 102 and less than the melting point of the substrate. A person having ordinary skill in the art would be able to readily determine these temperatures by referring to reference manuals or by performing well-known assays (e.g., Vicat softening point is a standardized test that is used to determine the temperature at which a material is penetrated to a depth of 1 mm by a flat-ended needle with a 1 mm² circular or square cross-section—for the Vicat A test, a load of 10 N is used; for the Vicat B test, the load is 50 N.). By way of example, the glass transition temperature (Tg) of PET is approximately 70° C., while its Vicat B softening temperature is approximately 82° C., and its melting point is about 260° C. Table 1 below provides the glass transition and Vicat softening temperatures of non-limiting substrates that can be used in the context of the present invention. The pressure source 320 can be a standard stainless steel metal roller/cylindrical bar. Any type of roller (e.g., metal rollers, rubber rollers, composite rollers, plastic rollers etc.) with any degree of hardness (e.g., 40, 50, 60, 70, 80, 90 points on the Shore A scale) provided that a sufficient amount of pressure can be applied to attach the micro- or nanostructures 108 to the substrate surface 314. A peel test or bending test can be used to determine whether sufficient attachment is achieved. In particular embodiments, the pressure applied by the pressure source 320 can be between 25 to 300 psi or 50 to 250 psi or 75 to 200 psi, and if a roller is used, the roller can move across the opposite surface of the substrate 102 at a rate of at least 0.1 cm/s up to 100 cm/s or at a speed of 0.5 to 12 cm/s or at a speed of 1 to 10 cm/s. In other embodiments, the pressure source 320 can be an opposing plate or other object that can be used to squeeze the substrate 102 between the heating source 318 and the pressure source 320.

TABLE 1

| Polymer Name | Glass transition temperature (Tg) ° C. | Melting point* (Tm) ° C. | Vicat B at load of 50 N ° C. |
| --- | --- | --- | --- |
| Polyethylene terephthalate (PET) | 70 | 260 | 82 |
| Polycarbonate (PC) | 147 | 155 | 145 |
| Polybutylene terephthalate (PBT) | 68 | 223 | 120 |
| Poly(1,4-cyclohexylidene cyclohexane-1,4-dicarboxylate) (PCCD) | 70 | 225 | 120 |
| Poly(phenylene oxide) (PPO) | 215 | 262 | 120 |
| Polypropylene (PP) | −5 to −20 | 170 | 108 |
| High density polyethylene (HDPE) | −90 | 130 | 128 |
| Polyvinyl chloride (PVC) | 100 | 170 | 80 |
| Polystyrene (PS) | 100 | 240 | 161 |
| Polymethylmethacrylate (PMMA) | 110 | 160 | 145 |
| Polyetherimide (PEI) | 215 | 380 | 125 |
| Terephthalic acid (TPA) elastomers | 425 | 500 | — |
| Glycol modified polycyclohexyl terephthalate (PCTG) | −3 | 207 | 170 |
| Thermoplastic elastomer (TPE) | 75 | 235 | 90 |
| poly(cyclohexanedimethylene terephthalate) (PCT) | 90 | 274 | 110 |

*or softening temperature when no clear melting temperature (Tm) is available.

Figure 4:
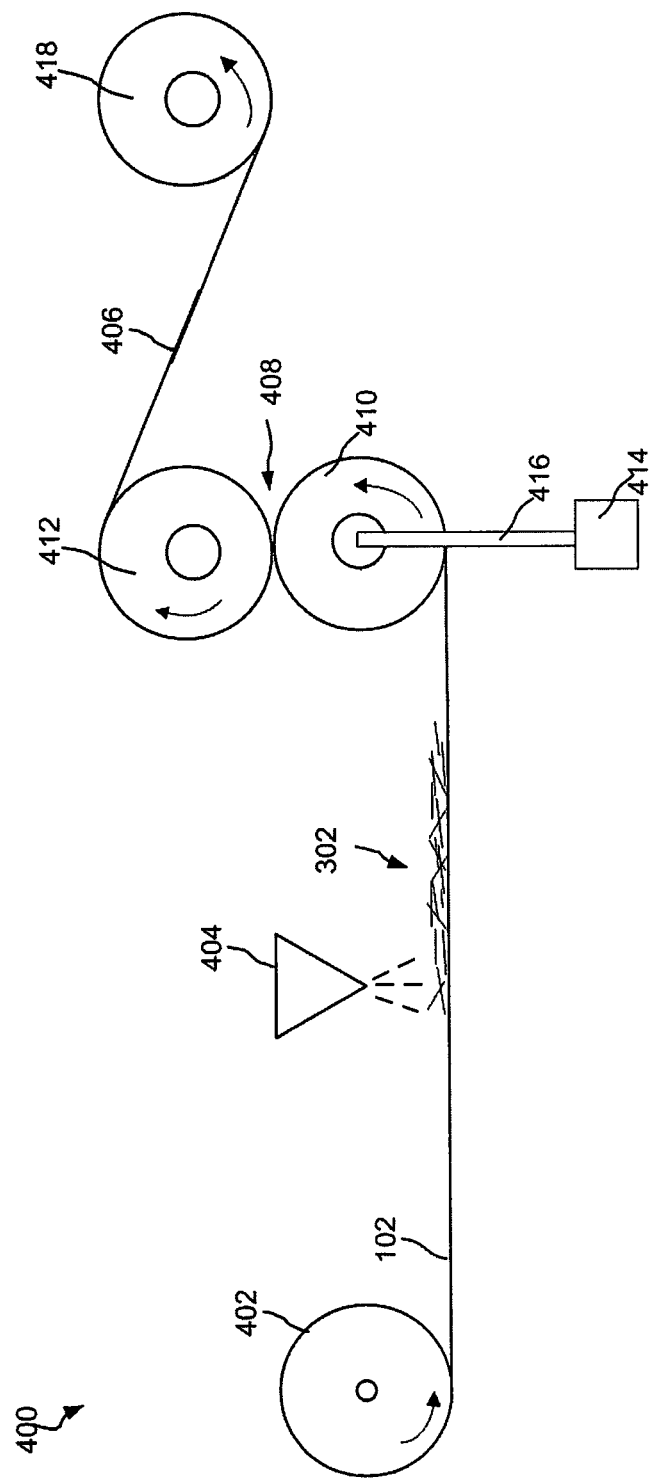
FIG. 4 is schematic of another method to make an electrically conductive layer having micro- or nanostructures embedded in at least a portion of the surface of a substrate of the present invention.

FIG. 4 represents yet another embodiment by which electrically conductive materials can be processed in accordance with the methods of the present invention. In particular, FIG. 4 illustrates a non-limiting roll-to-roll system 400 that can be used to produce electrically conductive substrates of the present invention. If desired the opacity, reflectivity, and transparency properties as well as the sheet resistance of the electrically conductive layer can be tuned or modified as desired without having to switch out the equipment or materials used in the system 400. The tuning parameters include varying the amount of electrically conductive micro- or nanostructures used (e.g. increasing the micro- or nanostructure loading can decrease the sheet resistance (i.e., amount of heat to be applied to the catalytic precursors) of the resulting film), varying the amount of pressure used (e.g., increased pressure can flatten out the micro- or nanostructures, thereby providing for more coverage of the surface area of the substrate and thus decreasing the sheet resistance of the resulting film), varying the temperature/heat used (e.g., increased heat can result in the micro- or nanostructures becoming deeply embedded into the substrate layer as well as increasing the likelihood that these structures flatten out more under pressure, thereby providing for more coverage of the surface area of the substrate and thus decreasing sheet resistance of the layer), and/or varying the type of micro- or nanostructures (e.g., larger structures can increase the coverage area of the substrate surface, thereby decreasing sheet resistance of the layer). The system 400 includes a supply roll 402 that provides the substrate 102 to be treated with the micro- or nanostructure composition 302. Downstream from the supply roll 402 is a depositing system 404 (e.g., an ultrasonic spray coating system such as the Sono-Tek ExactaCoat$^{sc}$ system) that is used to deposit the micro- or nanostructure composition 302 onto an exposed surface of the substrate 102. The depositing system 404 can be set to deposit a selected amount of the micro- or nanostructure composition 302 on the substrate 304 surface to produce an electrically conductive material 406 having electrically conductive micro- or nanostructures embedded into at least a portion of the surface. The coated substrate 102 is then passed through a nip 408 that is between a heated idler roller 410 and a drive roller 412. A pneumatic cylinder 414 can be connected via a rod 416 to the axle of the heated idler roller 410 to maintain a desired pressure on the coated substrate 102 when passing through the nip 408. The heat of the roller 410 and the pressure applied can each be set to achieve a particular property (e.g., transparency, opacity, or reflectivity) of the produced electrically conductive material 406 as well as a selected or targeted sheet resistance of the electrically conductive material 406 having electrically conductive micro- or nanostructures embedded into at least a portion of the surface. In passing over the surface of the heated idler roller 410, the substrate 102 surface coated with the composition 302 is heated to a temperature that is greater than the glass transition temperature or the Vicat softening temperature of the substrate 102 and less than the melting point of the substrate as it passes through the nip 408, the temperature being below the melting temperature of micro- or nanostructures in the composition 302. The simultaneous application of heat and pressure allows for the micro- or nanostructures to sufficiently adhere to the substrate 102 and form a mesh or web of interconnected structures, thereby producing an electrically conductive material 406. As the electrically conductive material 406 leaves the drive roller 412 it is collected onto a take-up roll 418. In an alternative embodiment, the drive roller 412 can also be heated, thereby providing heat to both surfaces of the substrate 102. In still another embodiment, the drive roller 412 can be heated and the idler roller 410 is not heated, thereby providing heat to the back surface of the substrate 102 that does not include the micro- or nanostructure composition 302. Still further, the positions of the idler roller 410 and the drive roller 412 can be switched such that the idler roller comes into direct contact with the back surface of the substrate 102 and the drive roller comes into direct contact with the front surface of the substrate 102 that has the composition 302 deposited on the front surface. Also, the produced electrically conductive material 406 can then be fed into another roll-to-roll process to provide a protective layer for the electrically conductive material during shipping or storage or to continue the process of coating the electrically conductive material 406 with the catalytic precursor, or combination thereof. Non-limiting examples of protective layers include polyethylene films, low-density polyethylene films, linear low-density polyethylene films, medium-density polyethylene films, high-density polyethylene films, ultra-high-molecular-weight polyethylene films, etc.

2. Deposition of Support Material

Figure 5:
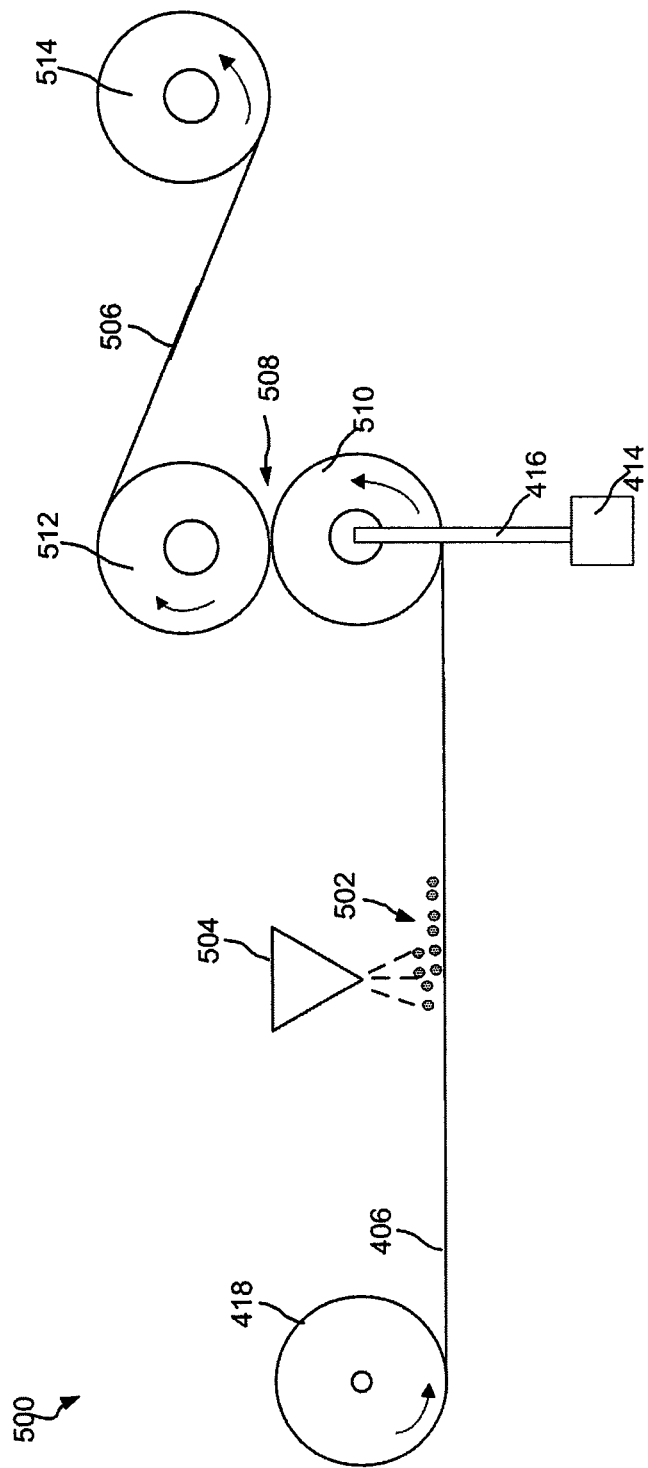
FIG. 5 is schematic of a method to deposit support material on an electrically conductive layer and substrate of the present invention.
Figure 6:
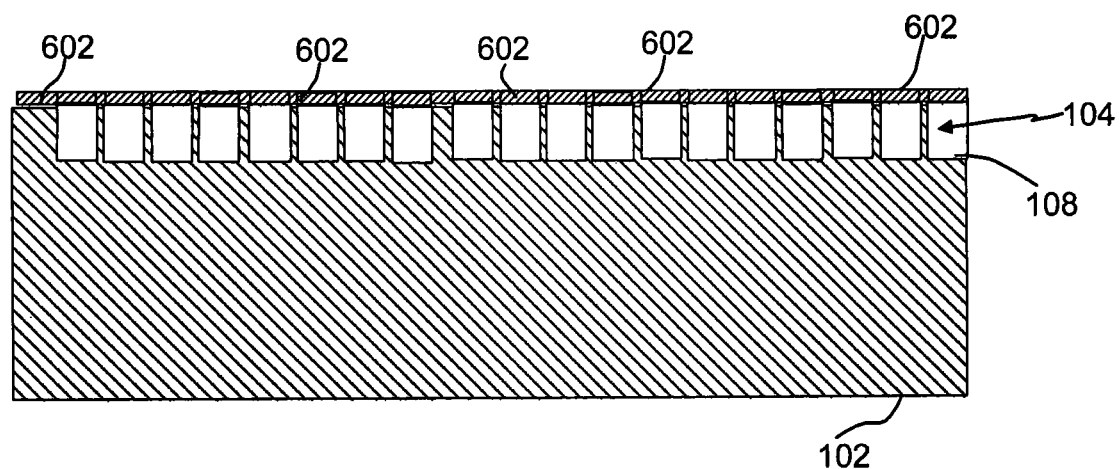
FIG. 6 is cross-sectional schematic of a supported catalytic precursor material that includes a substrate, an electrically conductive layer with micro- or nanostructures embedded into at least a portion of a first surface of the substrate, and support material of the present invention.

In some embodiments, the support material is deposited on the electrically conductive micro- or nanostructures that are above the surface of the substrate, on the substrate or both. The support material can be deposited using known techniques such as spray coating, ultra-sonic spray coating, roll-to-roll coating, chemical vapor deposition, or the like. Referring to FIG. 5, a schematic of a method to deposit support material on the produced electrically conductive material 406 is depicted. Roll 418 (or a supply roll) provides electrically conductive material 406 that is to be treated with the support material composition 502 or a support material composition. The support material can be a mixture of support material previously described dispersed or dissolved in a medium (e.g., water). Downstream from take up roll 418 is a depositing system 504 (e.g., an ultra-sonic spray coating system such as the Sono-Tek ExactaCoat$^{sc}$ system) that is used to deposit the support material composition 502 onto an exposed surface of micro- or nanostructures 108 or the exposed surface of the substrate 102. The depositing system 504 can be set to deposit a selected amount of the support material composition 502 on the substrate 102 surface or the exposed surface of the micro- or nanostructures 108 to produce a coated electrically conductive material 506 having electrically conductive micro- or nanostructures embedded into at least a portion of the surface coated with support material and/or a portion of the substrate surface coated with the support material. In some embodiments, the support material coats at least 80%, 90%, 99%, 100% of the surface of the electrically conductive material 406 including the micro- or nanostructures and the surface of the substrate. The support is deposited such that the thickness of the support material does not interfere with the heating ability of the electrically conductive layer 104. The coated electrically conductive material 406 is then passed through a nip 508 that is between a heated idler roller 510 and a drive roller 512. As described for FIG. 4, the coated electrically conductive material 406 is heated, pressed or both to attach the support material to the exposed surface of the micro- or nanostructures, exposed surface of the substrate or both to produce coated electrically conductive material 506. The coated electrically conductive material 506 is taken up on take-up roll 514. FIG. 6 depicts a cross-sectional view of the coated electrically conductive material 506. As shown in FIG. 6, support material layer 602 is on the surface of electrically conductive layer 104 and on the surface of the substrate 102. This material can then have the catalytic precursor material deposited on the support layer using known deposition techniques or methods described throughout the specification to produce the catalytic precursor substrate. In some embodiments, a support precursor can be sublimed onto the electrically conductive micro- or nanostructures or onto the substrate, or both, using techniques or methods described throughout the specification, and then be transformed into the support material by heat. This can occur under oxygen-free conditions in certain circumstances where oxidation of the formed support is of concern. For example, tertiary butyl aluminum oxide or tertiary butyl aluminum hydroxide can be evaporated and deposited as a thin film onto a substrate containing the electrically conductive micro- or nanostructures as is, or by converting the precursor after resistive heating to form $Al_2O_3$ layer with particles having a desired form and grain size.

3. Deposition of Precursor Material Prior and/or During Manufacture of Electronically Conducting Layer The precursor material can be deposited on the electrically conductive micro- or nanostructures in a number of ways. By way of example, the precursor material can be deposited onto the electrically conductive micro- or nanostructures 1) prior to providing pressure to electrically conductive layer containing the micro- or nanostructures, 2) prior to heating the substrate and the electrically conductive micro- or nanostructures, provided that the precursor material does not convert to the nanostructured (e.g., catalytic) material at the Vicat temperature of the substrate, 3) after depositing a support material on the electrically conductive material or substrate surface and then depositing the precursor material onto the support, 4) after embedding at least a portion of the electrically conductive micro- or nanostructures into the substrate or any combination thereof. In some instances, the precursor (or support) can be sublimed onto a heated conductive layer, where it is converted to the desired nanostructure (or support) form. This can occur under oxygen-free conditions in certain circumstances where oxidation of the formed nanostructure or catalyst, or support, is of concern.

Figure 7:
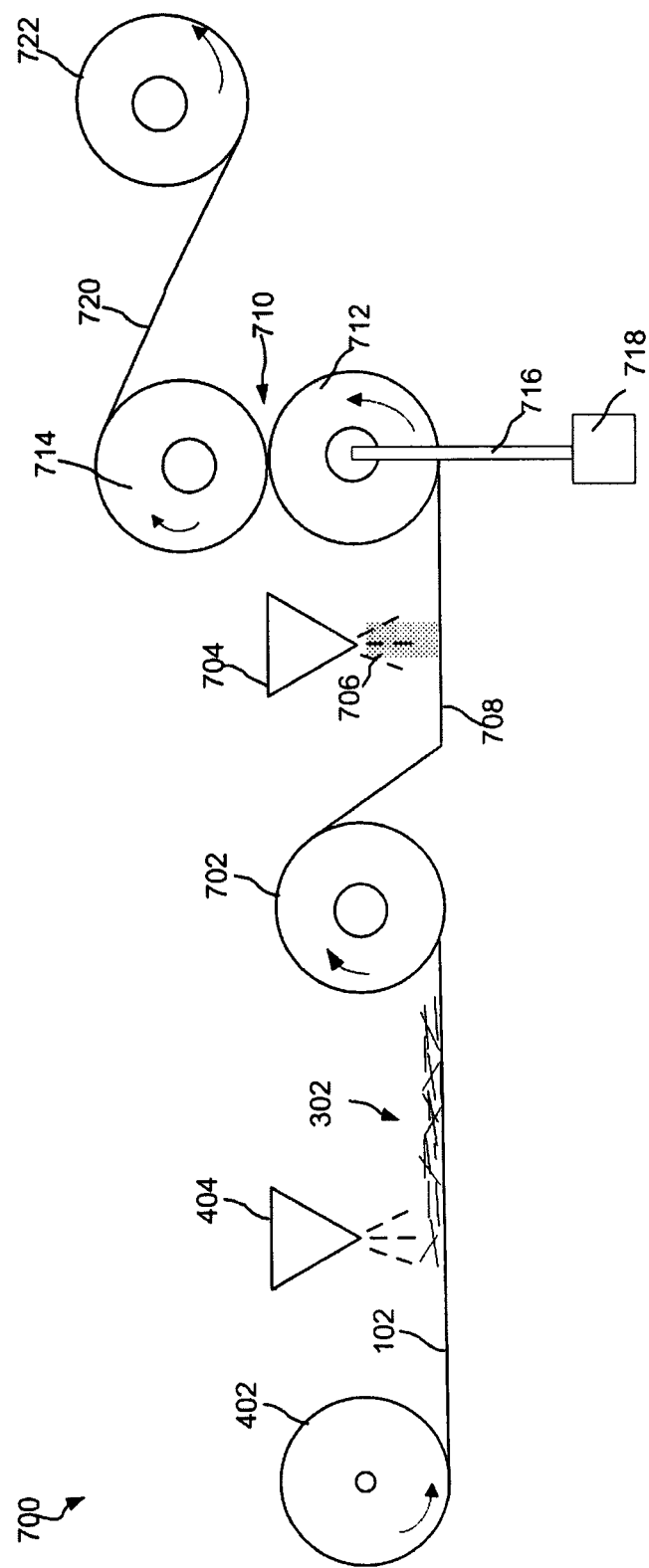
FIG. 7 is a schematic of an embodiment of the present invention for depositing catalytic precursor material on an electrically conductive layer with micro- and/or nanostructures embedded into at least a portion of a first surface of the substrate of the present invention.

The precursor material can be deposited on the micro- or nanostructures prior to the electrically conductive micro-and/or nanostructures 108 being embedded in the substrate 102—either prior to heating or prior to pressure being applied. Non-limiting examples of deposition techniques include chemical vapor deposition, metal oxide vapor deposition, plasma deposition techniques, and atomic layer deposition. By way of example, the precursor material can be dispersed (e.g., mixed) with the micro- or nanostructure composition and/or the micro- or nanostructure/support material composition to produce a composition that includes the catalytic precursor material coated on the micro- or nanostructure. Such a composition can be applied to the substrate 102 using the ultrasonic deposition methods described above for FIGS. 3 and 4. In yet another embodiment, the precursor material can be deposited on the electrically conductive material prior to pressing the electrically conductive layer such that the micro- or nanostructures are embedded into at least a portion of the substrate. FIG. 7 is a schematic of an embodiment of a system for depositing the precursor material on the substrate and/or the micro- or nanostructures prior to pressing the substrate containing the micro- or nanostructures. Similar to the systems described for FIGS. 4 and 5, system 700 includes a supply roll 402 that provides the substrate 102 to be treated with the micro- or nanostructure composition 302. Downstream from supply roll 402 depositing system 404 is used to deposit the micro- or nanostructure composition 302 onto an exposed surface of the substrate 102. The coated substrate 102 is then passed over heater roll 702 to heat the substrate 102 to a temperature that softens the substrate (e.g., the Vicat temperature of the polymeric substrate). Downstream from heated roll 702, depositing system 704 is used to deposit the precursor composition 706 onto the exposed surface of the substrate 102 and the exposed surface of the micro- or nanostructures 108 heated substrate 708. Heated substrate 708 includes the substrate 102 and the electrically conductive micro- or nanostructures 108. Depositing system 704 can be any depositing system capable of depositing the precursor material onto the heated substrate (e.g., an ultrasonic spray coating system). In some embodiments, heated substrate 708 is cooled prior to depositing the precursor material onto the substrate. Such cooling can inhibit the precursor material from prematurely converting to the nanostructure (e.g., catalytic) material. Coated substrate 708 is passed through a nip 710 that is between an idler roller 712 and a drive roller 714. As previously described pneumatic cylinder 716 connected via a rod 718 to the axle of the idler roller 712 can maintain a desired pressure on the coated substrate 708 when passing through the nip 712. The simultaneous application of pressure allows for the electrically conductive micro- or nanowire structures and precursor material to sufficiently adhere to the substrate 708 and form a mesh or web of interconnected structures, thereby producing an electrically conductive material 720 having precursor material deposited thereon. As the electrically conductive material 720 leaves the drive roller 714 it is collected onto a take-up roll 722. In an alternative embodiment, the drive roller 412 can also be heated, thereby providing heat to both surfaces of the substrate 102. In some instance, the produced electrically conductive material 720 can then be fed into another roll-to-roll process to provide a protective layer for the electrically conductive material during shipping or storage. Non-limiting examples of protective layers include polyethylene films, low-density polyethylene films, linear low-density polyethylene films, medium-density polyethylene films, high-density polyethylene films, ultra-high-molecular-weight polyethylene films, etc.

4. Deposition of Support Material and Precursor Material

Figure 8:
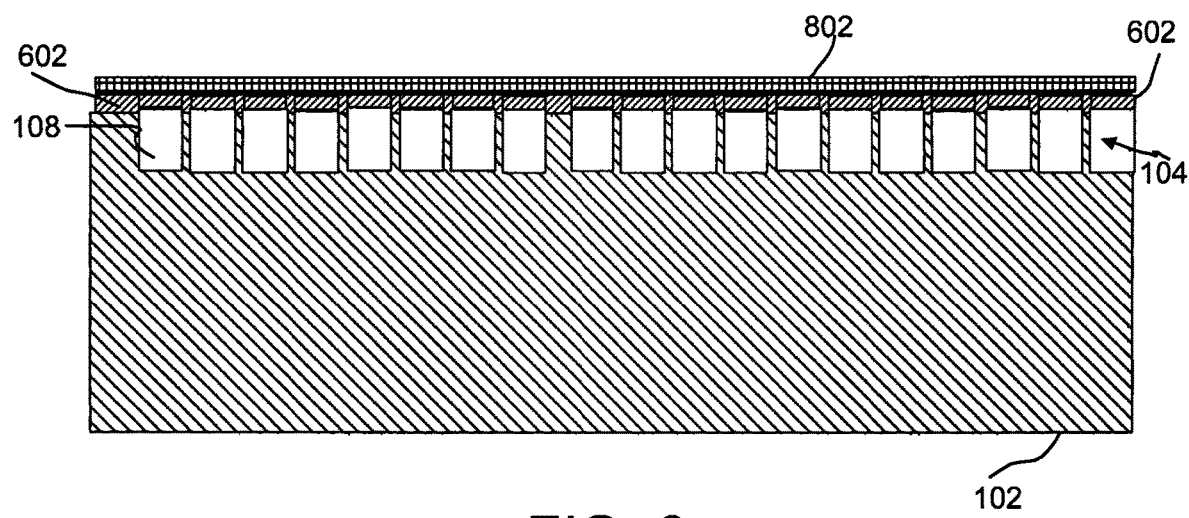
FIG. 8 is cross-sectional schematic of a supported catalytic precursor material that includes a substrate, an electrically conductive layer with micro- and/or nanostructures embedded into at least a portion of a first surface of the substrate, support material layer, and a catalytic precursor material layer of the present invention.

In some instances the precursor material (e.g., catalytic, metal oxide precursor, or metal precursor) can be combined with the support material and the support/catalytic material can be deposited on the electrically conductive layer after the electrically conductive layer has been attached to the substrate. For example, the support coating composition 502 in FIG. 5 or 702 in FIG. 7 can include catalytic precursor material or the catalytic precursor composition can include support material. The mixture of support and catalytic precursor material can be deposited on the electrically conductive material in a similar manner as described in FIGS. 5 and 7. In some embodiments, the precursor material is deposited after the support material has been deposited. By way of example, catalytic precursor deposition system 702 can be located downstream support coating composition system 504 in FIG. 5, or a support material composition system 504 can be located upstream of catalytic precursor composition system 702 in FIG. 7 or upstream of heated roller 702 in FIG. 2. If a support material is used, the resulting precursor substrate can have precursor layer 802 on top of support material 602 as shown in FIG. 8. In FIGS. 6 and 7, the support material and the precursor material are deposited on the surface of the substrate 102 and the electrically conductive micro- or nanostructures 108. In some embodiments, the substrate 102 surface is masked and the support material and precursor material are deposited primarily on the electrically conductive micro- or nanostructures 108. In other embodiments, the support layer and precursor layer is a single layer (i.e., the catalytic material is mixed in the support layer). An example of sublimation of support material onto a substrate is described by Giolando et al., in "CVD of Alumina on Carbon and Silicon Carbide Microfiber Substrates for Microelectrode Development", in Chemical Vapor Deposition, 2002, Vol. 8, pp. 93-98, which is incorporated herein by reference.

5. Deposition of Precursor Material after Embedding Micro- or Nanostructures

Figure 9:
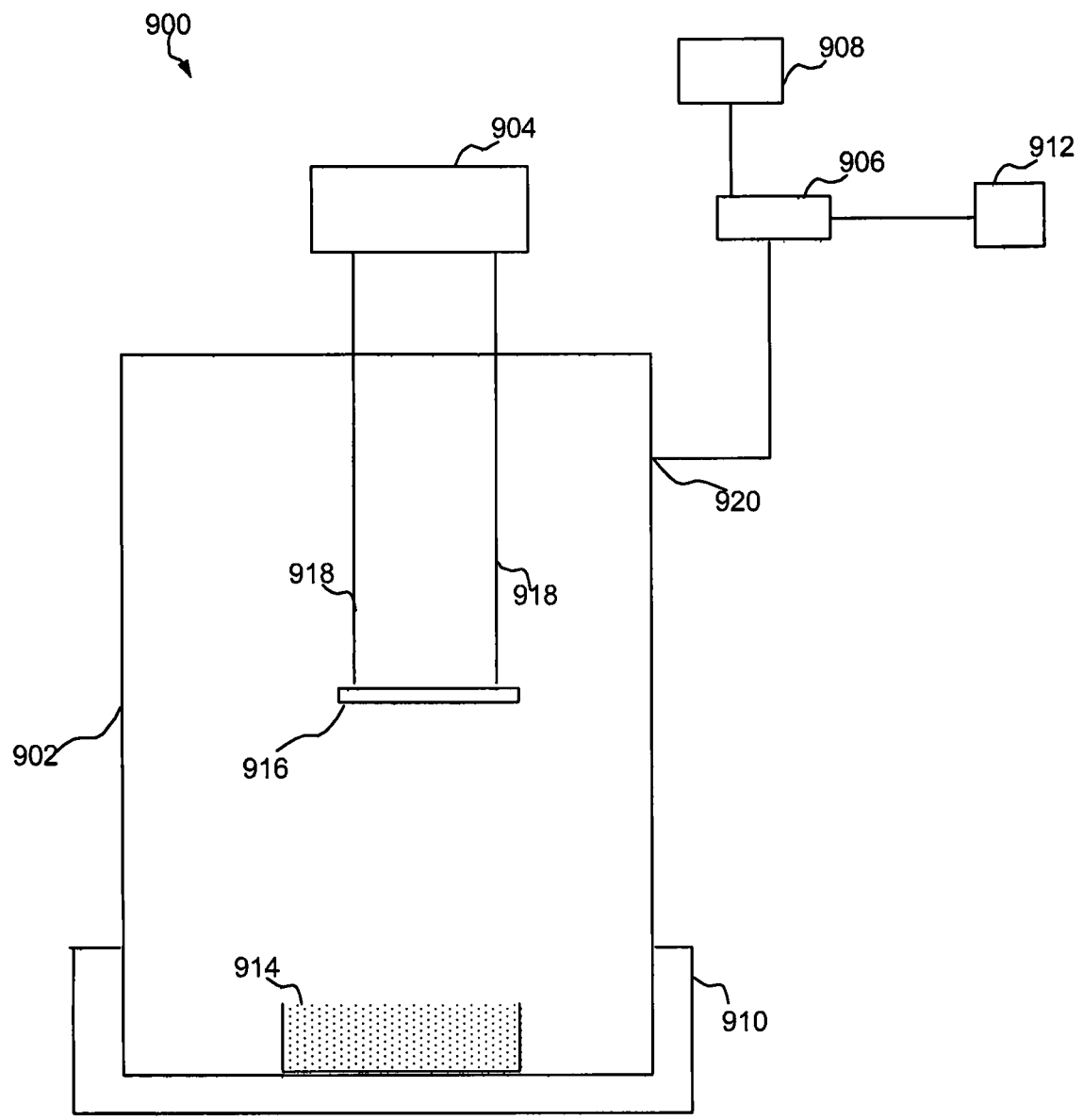
FIG. 9 is a schematic of an embodiment of the present invention to deposit catalytic precursor material on an electrically conductive layer with micro- and/or nanostructures embedded into at least a portion of a first surface of a substrate.

In another aspect of the invention the precursor material can be deposited onto the electrically conductive material (e.g., electrically conductive material 406 in FIG. 4 and/or electrically conductive material 506 in FIG. 5) using sublimation. In some embodiments, the precursor material can be placed in a sublimation chamber, vacuum can be applied to purge the chamber of air to inhibit oxidation of the micro- or nanostructures, and then the precursor material can be sublimed onto the electrically conductive material. FIG. 9 is a schematic of a chemical vapor deposition (sublimation) system 900 to deposit the precursor (e.g., catalytic) material on the electrically conductive layer that has micro- or nanostructures embedded in at least a portion of a surface of the substrate. System 900 can include chamber 902, power supply 904, vacuum/air manifold 906, vacuum pump 908, heating/cooling device 910 and air supply 912. Precursor material 914 can be positioned in a bottom portion of chamber 902. The electrically conductive material 916 can be positioned above the precursor material 914. Electrically conductive material 916 can include a substrate that has micro- and/or nanostructures embedded in a least a portion of the substrate as described throughout the specification. In some embodiments, electrically conductive material 916 also includes a support material (e.g., $Al_2O_3$). As shown, electrically conductive material 916 is suspended in the chamber 902 by electrical connectors 918, which are connected to power supply 904. Manifold system 906 can be connected to chamber inlet 920, vacuum pump 908 and air supply 912. Chamber 902 can be purged with an inert gas (e.g., argon) from air supply 912, and then placed under vacuum (e.g., 0.15 Torr) to remove oxygen from the chamber. In some embodiments, the removal of oxygen is not needed. Chamber 902 can then be evacuated using vacuum pump 908 to a desired vacuum. Once the desired vacuum is reached, the electrically conductive material 916 can be resistively heated to a desired temperature by applying voltage from power supply 904. The precursor material 914 can be heated using a heating/cooling device 910 to its sublimation or vaporization temperature. When the precursor material 914 is in the vapor phase the potential across the electrically conductive material 916 is adjusted using power supply 904. The precursor material 914 and the electrically conductive material 916 can be heated for a desired amount of time. Deposition of the precursor material 914 can occur simultaneously with applied voltage across the electrically conductive material 916 in order to obtain a controlled and precise heating of the micro and/or nanostructures to yield the desired nanostructured material (catalytic) or support structures. This controlled and precise heat at the electrically conductive micro- and/or nanostructures can be the driver for highly controlled formation of the catalytic nanostructured layer. The amount of time for deposition of the precursor 914 can correlate to the thickness of the film. For example, a 1 minute deposition period can result in a catalytic precursor film having a thickness of 3 micrometers. The ability to control the film thickness is advantageous since the thickness can be changed depending on the application. The chamber 902 can be cooled using heating/cooling device 910 and the potential across the conductive layer can be reduced by decreasing the voltage from power supply 904 to further promote an even distribution of precursor material 914 onto the conductive layer material 916. The precursor material 914 can deposit on the electrically conductive micro- and/or nanostructures, the substrate, or both. In some embodiments, the precursor material 914 is deposited as a thin film on the electrically conductive material 916. The process can be repeated with the same precursor material or a different precursor material until the desired layers of precursor material and/or catalyst is deposited on the electrically conductive material 916. In some embodiments, a catalyst material is deposited onto the electrically conductive material directly. In certain embodiments, the support material or its precursor can be deposited and/or formed on the electrically conductive material prior to deposition of the catalytic precursor material or catalyst.

In some instances, the electrically conductive material 406 includes a mask that covers the surface of the substrate and allows the micro- or nanostructures to be exposed. In such an instance, the precursor material deposits on the micro- or nanostructures and the mask can be removed from the electrically conductive material to produce a supported precursor article (e.g., catalytic precursor article) that has a minimal to no precursor material on the surface of the substrate.

E. Applications

1. Catalyst Applications

The supported catalyst of the present invention can be used in a wide range of chemical applications. Non-limiting examples of chemical applications include an oxidative coupling of methane reaction, a hydrogenation reaction, a hydrocarbon catalytic cracking reaction, an alkylation reaction, a denitrogenation reaction, a desulfurization reaction, a Fischer-Tropsch reaction, a syngas production reaction, steam reforming of methane, selective reduction of NOx, 3-way catalytic reaction in automobiles and water splitting. The supported catalyst can be attached to a surface or an interior lining of a chemical reaction unit (e.g., a reaction chamber, vessel and the like). In some embodiments, the supported catalyst is fabricated in the reaction chamber and used in situ. In certain embodiments, the supported catalytic precursor and/or the catalytic material is fabricated as part of the reactor lining.

Figure 10:
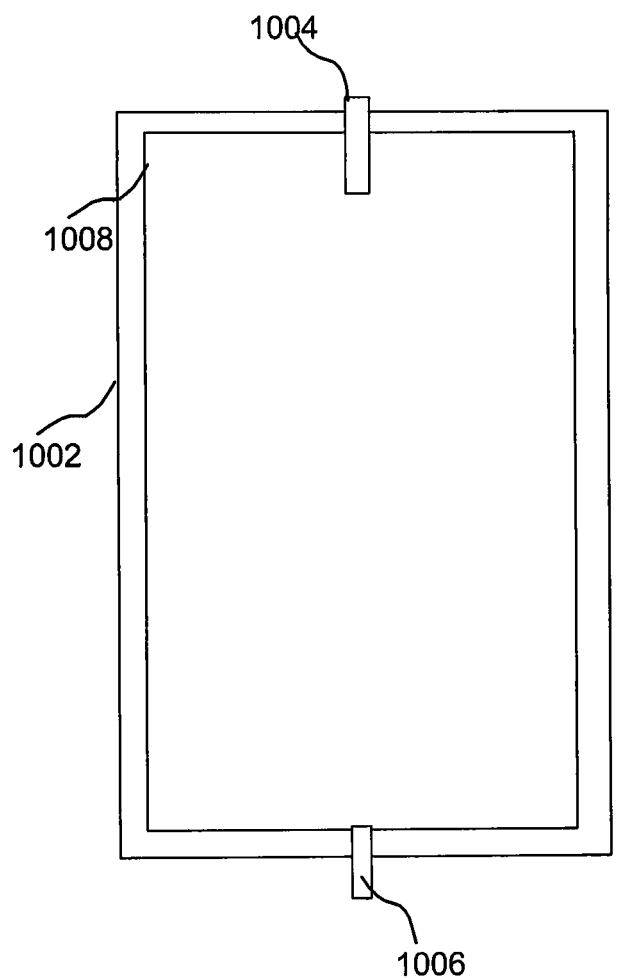
FIG. 10 is a schematic of a system that includes the supported catalyst of the present invention.

The supported catalyst of the present invention can be part of a system for catalyzing a chemical reaction. FIG. 10 depicts a system for catalyzing a chemical reaction. In one particular embodiment, the catalysts of the present invention can be useful for endothermic reactions such as steam reforming dehydrogenation reactions. The design allows for heating the catalyst rather than heating the entire reactor when there is a need to remove compounds such as carbon monoxide and other hydrocarbons (to minimize the potential for coking). In FIG. 10, chemical system 1000 includes reaction zone 1002, supported catalyst, inlet 1004, and outlet 1006. Reaction zone 1002 can be a single reaction vessel, a portion of a single reaction vessel or a zone in multiple reaction units. Supported catalyst is positioned in reaction zone 1002. In FIG. 10, supported catalyst is attached to the inner surface 908 (e.g., liner) of the reaction zone 1002. In some embodiments, the inner surface is a reactor lining. Attachment of the supported catalyst to the inner surface provides more surface area for the catalytic reaction, improved heat transfer between the catalyst and the reactants, thus lower coking tendencies, and/or ease in removal of the catalyst from reaction zone. In some embodiments, the supported catalyst is positioned on a support in the reaction zone, or fluidized in the reaction zone, or mixed with the reactant feed. The reaction zone 1002 is in fluid communication with an inlet 1004 and outlet 1006. Inlet 1004 can be used to charge the reactant feed (e.g., hydrocarbon compositions, water, reaction chemicals, solvents, etc.). The reactant feed contacts the supported catalyst 100 and produces product. During the process the reaction zone 1002 can include the reactant feed and the product. Outlet 1006 can be used to remove the product stream from the reaction vessel. In some embodiments, inlet 1004 and outlet 1006 are the same conduit. A collection vessel can be in fluid communication with outlet 1006 to collect the product stream.

2. Other Applications

The produced materials of the present invention containing micro- and/or nanostructures can also be used in a variety of applications other than chemical catalysis. Non-limiting embodiments of other applications include electronic applications, energy generation and storage applications, plasmonic applications, optical applications, and/or controlled release applications. In some aspects, optical film, a plasmonic substrate, a zero Possion's ratio material, a responsive polymer material, a flexible nano-device, a catalytic architecture, a controlled release media, a separation media, a membrane, energy storage, sensor device, medicinal or chemical delivery system, stretchable nano-devices, a stretchable sensor, a stretchable battery separator, a stretchable energy harvester, a stretchable piezoelectric devise, a stretchable transistor, a stretchable diode, or a stretchable capacitor. In some instances, the produced materials are grafted on inorganic supports or other polymers that can allow for the growth of the faceted nanoparticles directly on different kinds of article of manufacture substrates having different morphologies and curvatures, to directly incorporate the multifaceted nanoparticle in the article of manufacture. In some embodiments, the produced materials are stretchable capacitors, transistors, or diodes.

F. Catalytic System

The material of the present invention can be part of a system for catalyzing a chemical reaction. FIG. 10 depicts a system for catalyzing a chemical reaction. In one particular embodiment, the catalysts of the present invention can be useful for endothermic reactions such as steam reforming dehydrogenation reactions. The design allows for heating the catalyst rather than heating the entire reactor when there is a need to remove compounds such as carbon monoxide and other hydrocarbons (to minimize the potential for coking). In FIG. 10, chemical system 1000 includes reaction zone 1002, supported catalyst, inlet 1004, and outlet 1006. Reaction zone 1002 can be a single reaction vessel, a portion of a single reaction vessel or a zone in multiple reaction units. Supported catalyst is positioned in reaction zone 1002. In FIG. 10, supported catalyst is attached to the inner surface 908 (e.g., liner) of the reaction zone 1002. In some embodiments, the inner surface is a reactor lining. Attachment of the supported catalyst to the inner surface provides more surface area for the catalytic reaction, improved heat transfer between the catalyst and the reactants, thus lower coking tendencies, and/or ease in removal of the catalyst from reaction zone. In some embodiments, the supported catalyst is positioned on a support in the reaction zone, or fluidized in the reaction zone, or mixed with the reactant feed. The reaction zone 1002 is in fluid communication with an inlet 1004 and outlet 1006. Inlet 1004 can be used to charge the reactant feed (e.g., hydrocarbon compositions, water, reaction chemicals, solvents, etc.). The reactant feed contacts the supported catalyst 100 and produces product. During the process the reaction zone 1002 can include the reactant feed and the product. Outlet 1006 can be used to remove the product stream from the reaction vessel. In some embodiments, inlet 1004 and outlet 1006 are the same conduit. A collection vessel can be in fluid communication with outlet 1006 to collect the product stream.

EXAMPLES

The present invention will be described in greater detail by way of specific examples. The following examples are offered for illustrative purposes only, and are not intended to limit the invention in any manner. Those of skill in the art will readily recognize a variety of noncritical parameters, which can be changed or modified to yield essentially the same results.

Materials

Polycarbonate (PC) film substrates of 150 µm thickness were obtained from SABIC Innovative Plastics sold under the tradename of LEXAN™. Polyetherimide (PEI) film substrates were obtained from SABIC Innovative Plastics sold under the tradename ULTEM™. Conductive silver (Ag) paint was purchased from Ted Pella, Inc. (U.S.A.), zinc acetate dehydrate (98+%, A.C.S reagent), tetraethyl orthosilicate (TEOS, 99%, solution) and chloroplatinic acid ($H_2PtCl_6$) were purchased from Sigma-Aldrich® (U.S.A). Cooper wires (0.5 mm diameter) were used as connecting wires.

Example 1

Preparation of Supported Material Containing Joule Heaters

Supported material containing joule heaters were fabricated by putting a droplet of silver paint on copper wire placed at the edge of the polycarbonate film sheets (1.6 cm×0.3 cm) containing joule heaters made by embedding sliver nanowires (Ag NW) in the surface of the film. The heaters had a resistance of about 30-35 Ω/square). The electrode dimensions were kept fixed for all the experiments. A multi-meter was used to check the resistance of the electrode. DC voltage was applied to the film heater through a copper contact at the film edge and the current and resistance were monitored.

Example 2

Formation of Nanostructures on a Supported Material

A droplet of nanostructure precursor a salt solution (2-5 µL, $H_2PtCl_6$ ($1.95×10^{-4}$ M), TEOS, 99%, or zinc acetate (0.01 M in water)) was deposited on the supported material prepared as described in Example 1, which was connected to the DC power supply. The droplet did not dry during the experiment. The DC voltage ranging between 0.6 V and 6 V was applied (the voltage was raised to the desired value in steps of 0.2-0.3 V) for 1 hr. Three voltages were selected (2 V, 3.6 V, and 4.8 V) and joule heating of the salt was conducted for a specific duration (5 min, 10 min, 20 min, 40 min, and 60 min) at each voltage to convert the nanostructure precursor to a nanostructure (e.g., zinc acetate liquid to zinc oxide nanostructures, chloroplatinic acid to platinum nanostructures, and tetraethyl orthosilicate to silica nanostructures). Short nanowires had a length of 10 to 20 microns and long nanowires had a length of 30 to 40 microns Example 3

Characterization of Nanostructures

The supported structures containing the nanostructures were analyzed for morphology, size, and composition using scanning electron microscopy (SEM) and energy dispersive spectroscopy (EDS) using a JSM 7800F Prime (JEOL, U.S.A.)

1. Zinc Oxide Nanostructures in Polycarbonate Polymer Matrix

Figure 12:
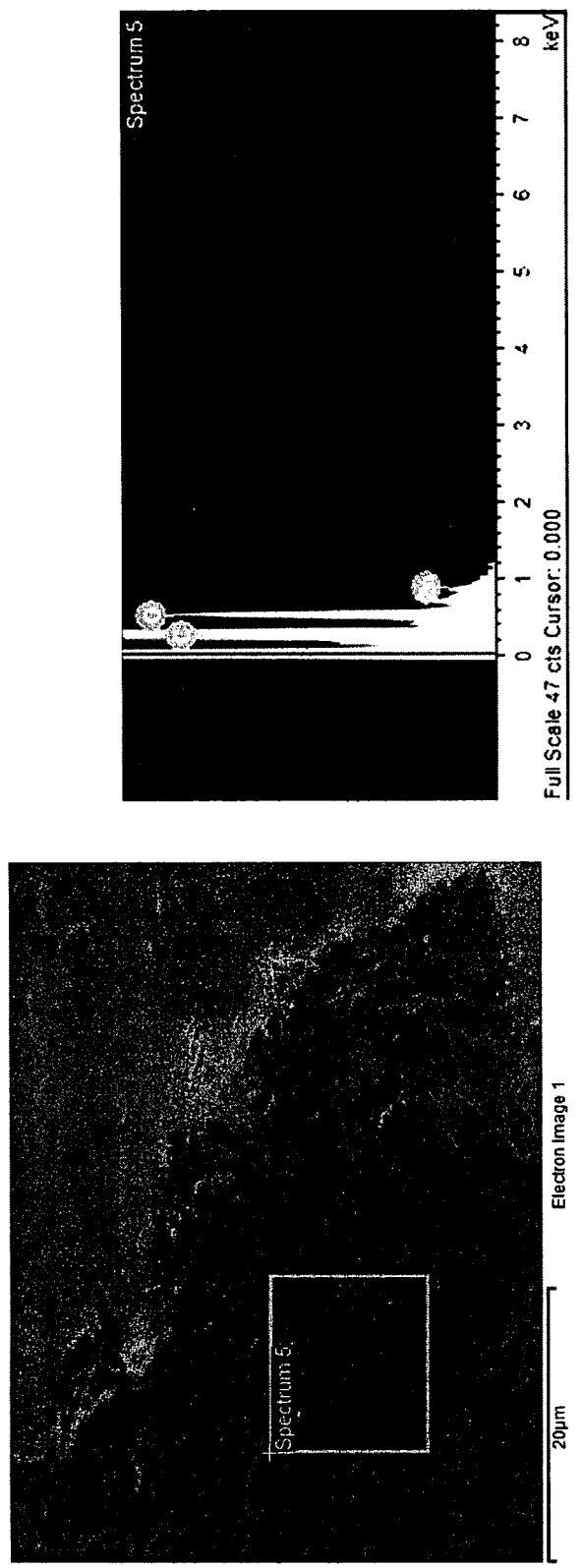
FIG. 12 shows the Energy Dispersive Spectroscopy (EDS) of the zinc oxide nanostructures obtained after the decomposition of the zinc acetate precursor under the applied voltage.
Figure 13:
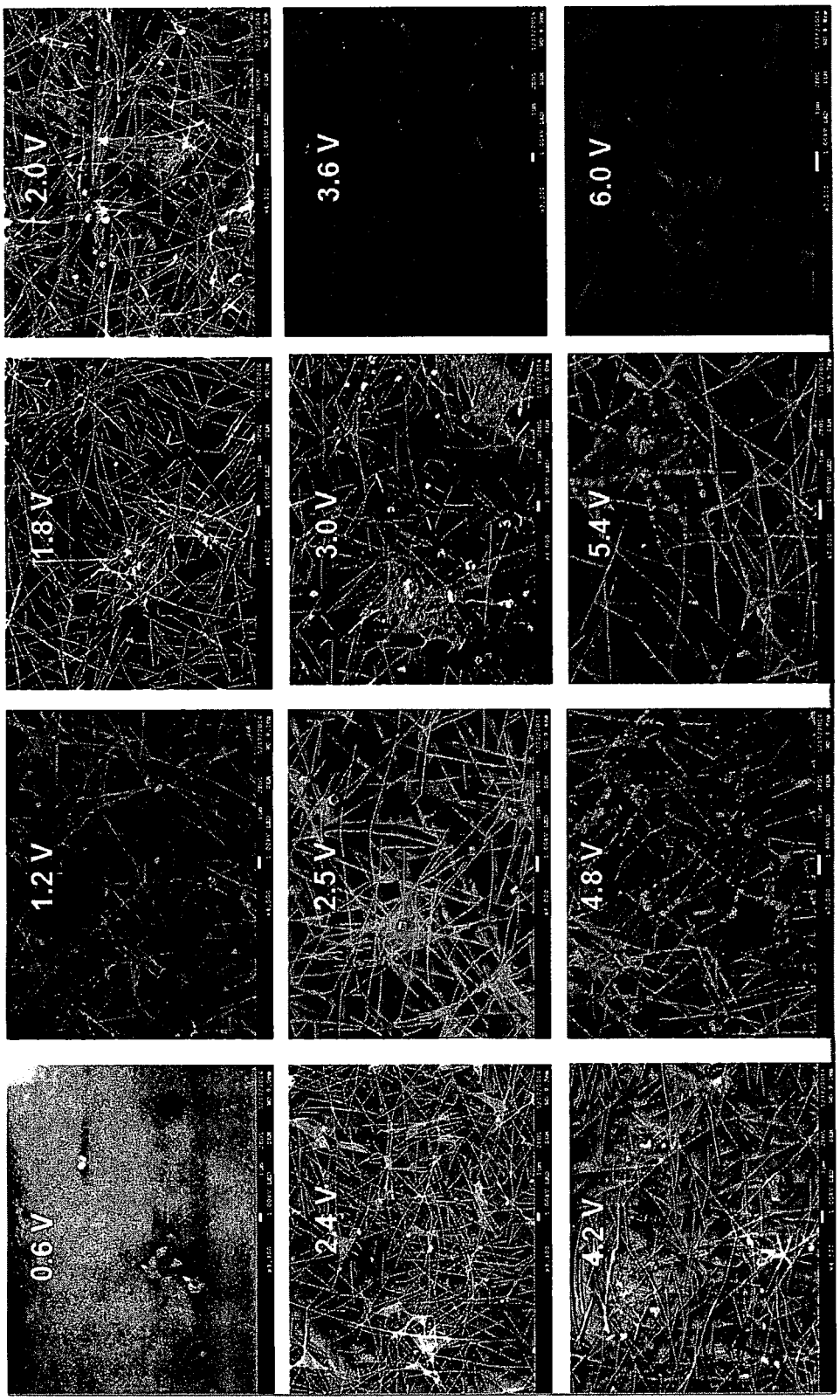
FIG. 13 shows different SEM images of the zinc oxide nanostructures formed from zinc acetate at various applied voltages under the various conditions listed in Table 2.
Figure 14:
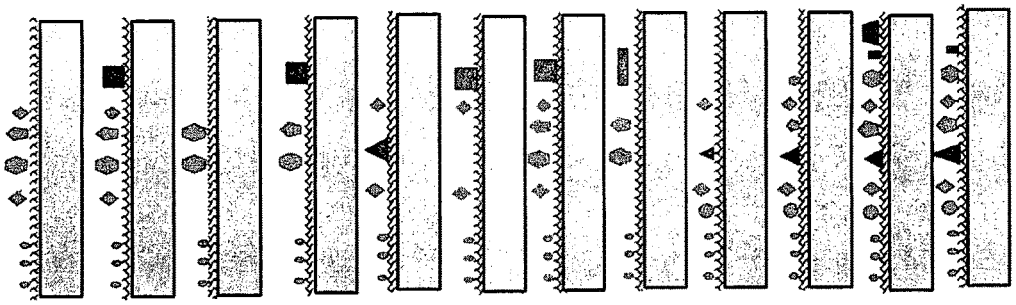
FIG. 14 shows Table 3, which lists the conditions for forming zinc oxide nanostructures from zinc acetate for various time periods, and a schematic of the types of nanostructures formed.
Figure 15:
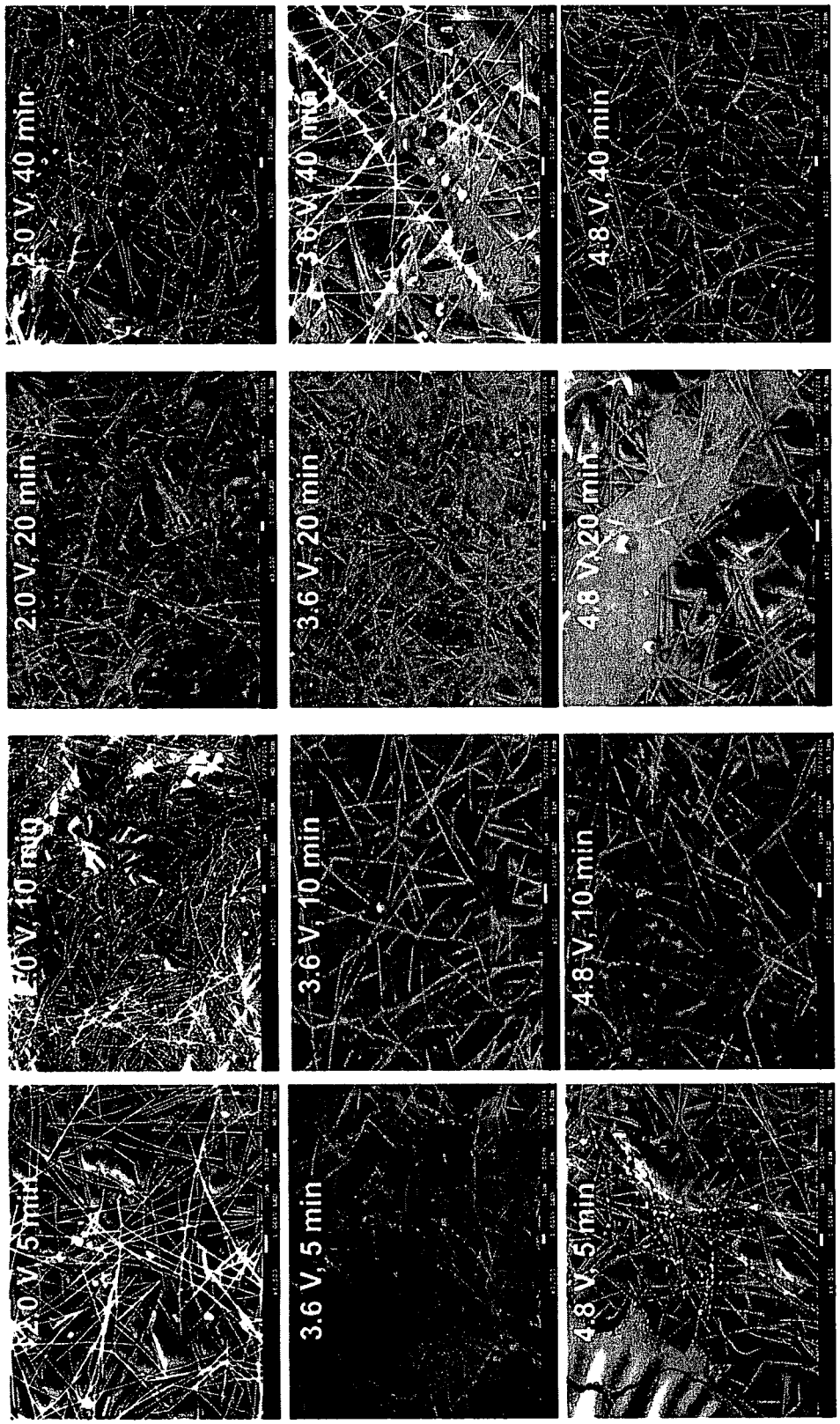
FIG. 15 shows SEM images of the forming the zinc oxide nanostructures at 2.0, 3.6 and 4.8 Volts at 5, 10, 20 and 40 minutes.

Different shapes of zinc oxide nanostructures evolved (cross-sections: circular, triangular, hexagonal, pentagonal, rectangular, rhombus, etc.) as a function of joule heating voltage and duration. FIG. 11 shows includes Table 2, which lists the conditions for forming the nanostructures from zinc acetate at a 1 hour duration time period, and a schematic of the types of nanostructures formed. FIG. 12 shows the EDS of the zinc acetate precursor decomposition to zinc oxide. FIG. 13 shows different SEM images of the zinc oxide nanoparticles formed from zinc acetate at 0.6 V, 1.2 V, 1.8 V, 2.0 V, 2.4 V, 2.5 V, 3.0 V, 3.6 V, 4.2 V, 4.8 V, 5.4 V, and 6.0 V under the conditions listed in Table 2. FIG. 14 shows Table 3, which lists the conditions for forming the nanostructures from zinc acetate for various time periods, and a schematic of the types of nanostructures formed. FIG. 15 shows SEM images of the forming the zinc nanostructures at 2.0, 3.6 and 4.8 V at 5, 10, 20 and 40 minutes. After each experiment, the supported material was inspected to determine if breakdown of the polymer was observed. It was observed that the voltage window between 2 and 5 V was suitable for tuning/obtaining these nanoparticles. Nanoparticle sizes less than 200 nm were observed. It was also observed that voltage between 2 V and 5 V for longer durations (40 min and 60 min) resulted in a shapes other than the expected wurtzite crystal structure (hexagonal facets). These shapes were circular, triangular, hexagonal, pentagonal, rectangular and rhombus. These other shapes were believed to be due to the presence of cubic (face-centered-cube) Ag nanowire in the vicinity of the growing nuclei of zinc oxide. Without wishing to be bound by theory, it is believed that the variety of shapes was attributed to lower temperature and uniform temperature gradients around the nanowires, which resulted in greater solid aggregate vapor pressure (due to coated salt) and caused imbalance in Gibb's free energy. Almost all of the nanoparticles were observed to form at the Ag nanowire junction or aggregated Ag nanowires. Without wishing to be bound by theory, it is believed that this phenomenon was due to the greater resistance at the AG wire junctions points, which resulted in temperatures suitable for decomposition of the zinc acetate. At temperatures generated by applying voltages between 2 and 4.8 V, the size of the nanostructure remained the same. In this voltage range, the size of the nanostructures was dominated by the Ag nanowire mesh density, junction resistance and temperature gradients. It was also observed that at voltages between 4.8 V and above, 2D layered hexagonal structures formed. These structures were in the form of large flakes. Some flakes were observed as germinating with time as shown in FIGS. 16 and 17, which show the growth of the zinc oxide nanostructures through decomposition of the zinc acetate precursor at 4.8 V for 10 min. and 20 min., respectively. At voltages greater than 5 V, it was observed that the polymer reorganized and the nanowire mesh coated with zinc acetate buried deeper into the polymer matrix. Upon decomposition of the zinc acetate, nanoparticles formed in the matrix of the polymer. Transparency of the polymer was unaffected by this phenomenon. Using the method of the present invention (i.e., site-specific temperature gradients (typically on or around Ag nanowire junctions)) controlled growth of shaped nanoparticles was obtained.

2. Platinum Nanostructure Formation in Polycarbonate Polymer Matrix

Figure 18:
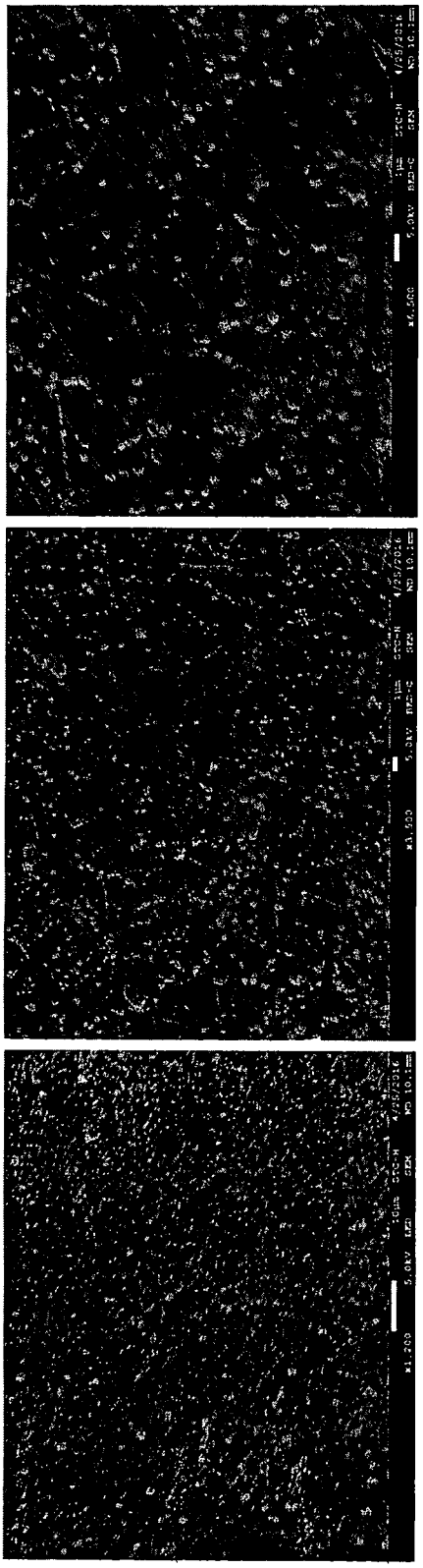
FIG. 18 shows 1.2, 3.5 and 6.5 magnifications (from left to right) of the platinum nanostructures formed after joule heating of the platonic acid under the following conditions: 4 V, $I_{initial}$=7 mA, $I_{final}$=2 mA, $R_{initial}$=186 Ω, $R_{final}$=928 Ω t=2 min.

FIG. 18 shows 1.2K×, 3.5K×, and 6.5K× magnifications (from left to right) of the platinum nanostructures formed after joule heating of the platonic acid under the following conditions: 4 V, $I_{initial}$=7 mA, $I_{final}$=2 mA, $R_{initial}$=186 Ω, $R_{final}$=928 Ω t=2 min. Such heating formed platinum metal nanoparticles.

3. Silicon Dioxide Nanostructure Formation in Polycarbonate Polymer Structure

Figure 19B:
FIGS. 19A and 19B show the silica precursor (FIG. 19A) and the silica dioxide (FIG. 19B), formed after joule heating of the silica precursor under the following conditions: 4 V, $I_{initial}$=22 mA, $I_{final}$=2 mA, $R_{initial}$=164 Ω, $R_{final}$=939 Ω t=5 days.
Figure 19A:
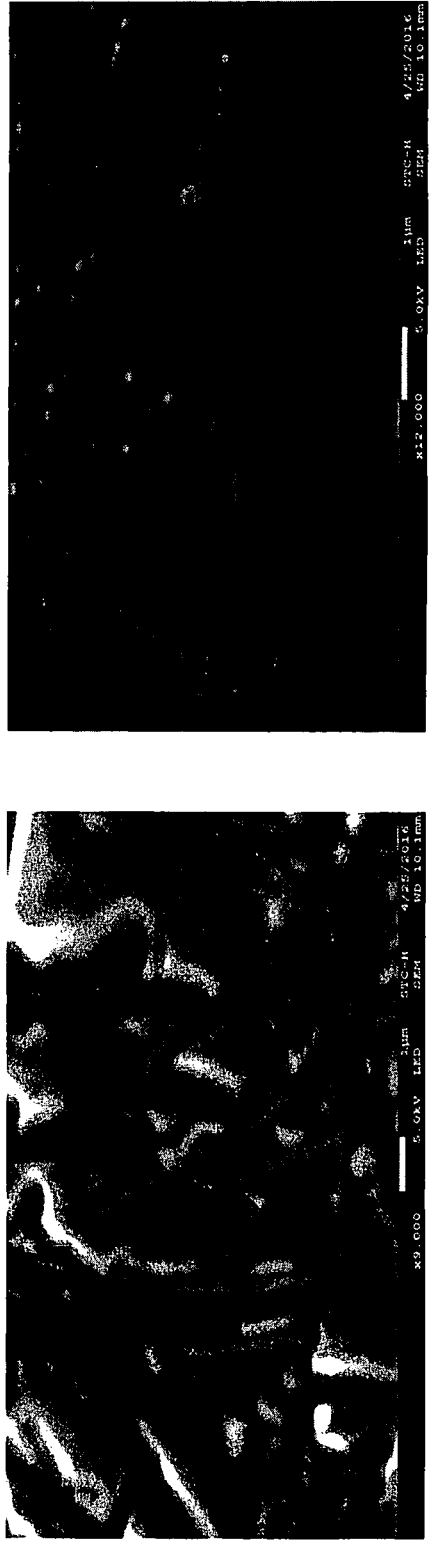

FIGS. 19A and 19B show the silica precursor (FIG. 19A, TEOS) and the silica dioxide (FIG. 19B), formed after joule heating of the TEOS under the following conditions: 4 V, $I_{initial}$=22 mA, $I_{final}$=2 mA, $R_{initial}$=164 Ω, $R_{final}$=939Ω, t=5 days, but breakdown occurred in 4-5 hrs. Such heating formed silicon dioxide nanoparticles.

4. Peel Testing

In order to demonstrate polymer composites with embedded nanostructures, a sandwich configuration was prepared. FIGS. 20A and 20B are schematics of a sandwich structure comprised of two polymeric films with embedded silver nanowires that were prepared. The nanowire embedded surfaces were facing each other while voltage was only applied to one of the films or surfaces. Before applying the voltage, a droplet of zinc acetate was inserted between the sandwich films or surfaces. As a control sample, same sandwich structure was prepared, but no voltage was applied (FIG. 20A). The sample under external voltage (FIG. 20B) was joule heated under following conditions: 4.8 V, $I_{initial}$=1 mA, $I_{final}$=1 mA, $R_{initial}$=984 Ω, $R_{final}$=984 Ω t=20 min. Both, control and joule heated samples were dried. For the peel test, the top and bottom polymer films were held by tweezer and forcefully peeled. However, the control sample was already peeled or separated after drying. This demonstrated that the sandwich structure, which was joule heated resulted in lamination of polymer films. The sample on which voltage was applied and after peel test showed (in SEM) that the side of films facing each other was covered with zinc oxide nanostructures. Since the joule heating resulted in high temperature and lamination of polymer films at interface, after peeling, the other facing side of the polymer film showed zinc oxide nanostructures sticking to the delaminated and re-organized polymer film/surface. Due to strong adhesion between the films, one of the facing sides showed significant number of exposed nanowires decorated with zinc oxide nanostructures while the other facing side showed thicker polymer film with negligible exposed nanowires and a few sticking zinc oxide nanostructures. This suggests that the polymer has melted, re-organized, and stronger adhesion of films enabled polymer from one film to stick with another film as it was delaminated. Thus, upon joule heating, two phenomena were observed in one-step: (1) lamination, and (2) growth of desired micro/nanostructure embedded between the polymer films. This can have uses in etchable separators, in sensors, membranes, energy storage, selective adsorbents, etc.

Example 4

Nanostructure Formation in Polycarbonate and Polyetherimide Polymer Films

Figure 22:
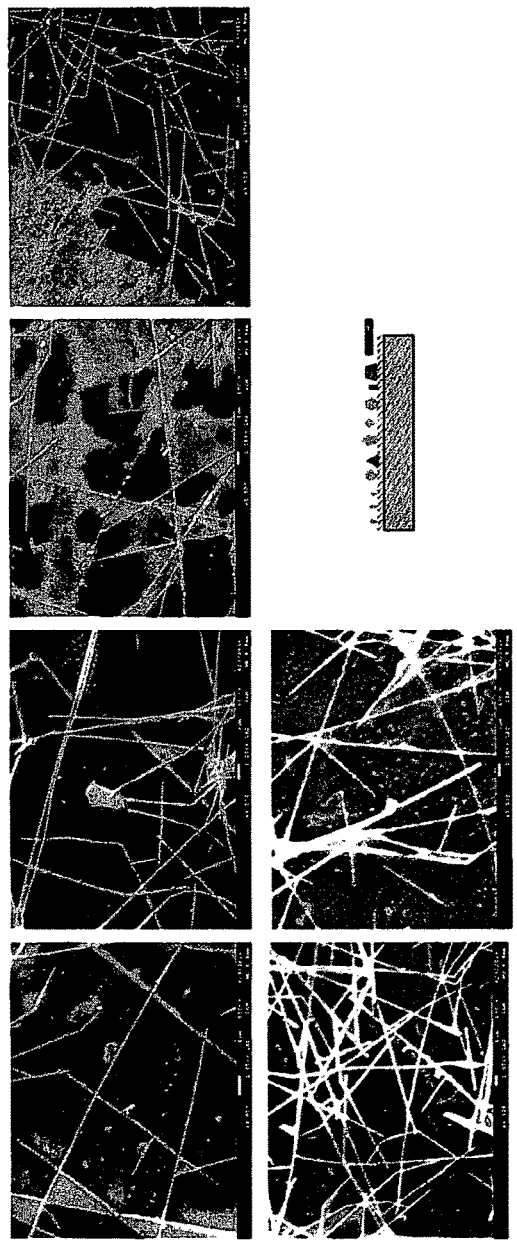
FIG. 22 shows SEM images of the zinc oxide nanostructures in polycarbonate.
Figure 23:
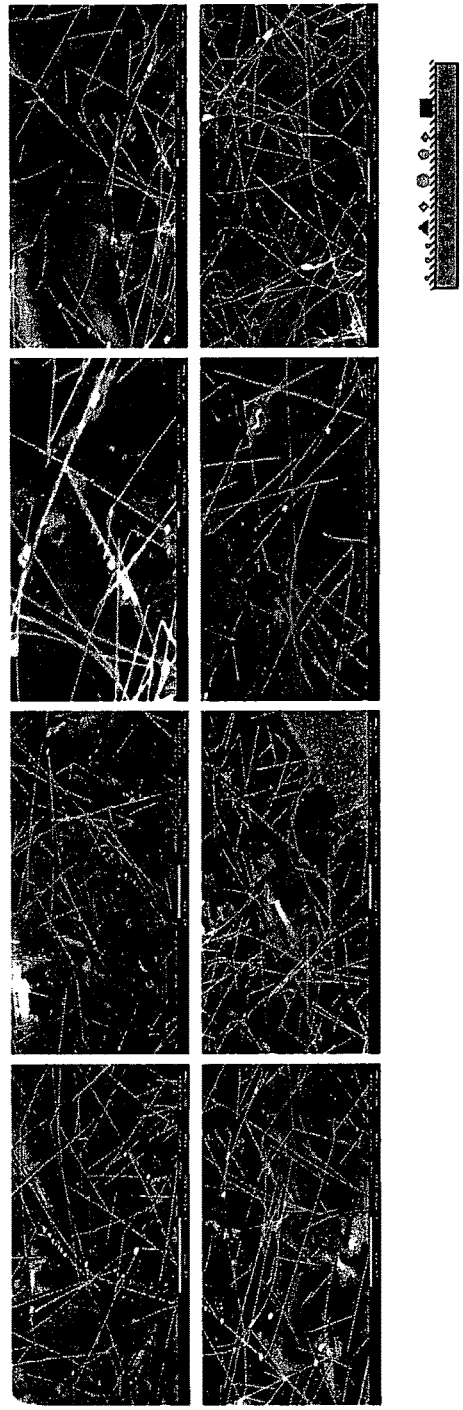
FIG. 23 shows SEM images of the zinc oxide nanostructures in polyetherimide films after joule heating at 3.6 V, and 20 minutes and a schematic of the formed nanostructures.

Zinc oxide Nanostructure formation in polycarbonate and polyetherimide polymer matrixes were evaluated as described in Example 1. Table 4 lists the conditions for the joule heating for both types of polymers. FIG. 21 shows SEM images of the zinc oxide nanostructures in polycarbonate films after joule heating at 3.6 V, and 20 minutes and a schematic of the formed nanostructures. FIG. 22 shows SEM images of the zinc oxide nanostructures in polycarbonate films after joule heating at 2.0 V, and 20 minutes and a schematic of the formed nanostructures. For the polycarbonate films, currents above 10 mA were observed at voltages of 2.0 V and 3.6 V. The morphologies were similar to short nanowire-polycarbonate films under same JH conditions as described in Example 3, however, large-sized and aggregated zinc oxide nanostructures were observed. The formation of large-sized and aggregated zinc oxide could be attributed to the high temperatures and gradients that led to aggregation and Ostwald's ripening (larger particles grow at expense of bigger). This was supported by rounded corners or spherical shape of aggregated or large particles (circled in the image in FIG. 21) as Ostwald's ripening effect is driven by curvatures. This process also resulted in several small particles as well (shown in squares in the FIG. 21). Nanorod shapes were also observed and could be attributed to electric-field assisted growth of ZnO crystals. FIG. 23 shows SEM images of the zinc oxide nanostructures in polyetherimide films made as described for the polycarbonate films after joule heating at 3.6 V, and 20 minutes and a schematic of the formed nanostructures. Negligible nanoparticle or nanostructure nucleation at voltages of 2 or less. At 3.6 V, zinc oxide nanostructures similar to short nanowire-polycarbonate films under 2 V for 20 min. These nanorods were attributed to electric-field assisted growth of zinc oxide

TABLE 4

| Voltage (V) | $I_{initial}/I_{final}$ (mA) | $R_{initial}/R_{final}$ (Ω) | Breakdown? | Duration (min) | $R_{initial}/R_{final}$ Ω/□ |
|---|---|---|---|---|---|
| Long nanowire Lexan films | | | | | |
| 2.0 V | 16/11 | 110/173 | No | 20 | 20.6/32.4 |
| 3.6 V | 11/1 | 182/620 | Yes | 20 | 34.1/116.3 |
| Long nanowire Ultem films | | | | | |
| 2.0 V | 11/1 | 140/990 | Yes | 20 | 26.3/185.6 |
| 3.6 V | 21/17 | 98/165 | No | 20 | 18.4/30.9 |

Wires having a length of 30 to 40 microns produced larger and more aggregated structures than wires having a length of 10 to 20 microns In the LEXAN samples having long nanowire, some nanorod structures were formed and this could be attributed to electric field assisted growth. Larger currents of 10-20 mA were observed for these samples. The formation of nanorods could be a claim, where we can say that not only temperature based decomposition but electric field assisted directional growth is also possible.

The invention claimed is:

1. A method for making a material having supported micro- and/or nanostructures, the method comprising:
   (a) obtaining a substrate comprising a precursor material and an electrically conductive layer of micro- or nanostructures embedded into at least a portion of a first surface of the substrate; and
   (b) applying a voltage across the electrically conductive layer to heat the micro- or nanostructures, wherein the heat converts the precursor material into micro- and/or nanostructures.

2. The method of claim 1, wherein precursor material is deposited on a surface of the electrically conductive layer, on a surface of the substrate, or both.

3. The method of claim 1, wherein the precursor material comprises a metal oxide, a metal nitrate, a metal hydroxide, a metal acetate, or an alkyl oxide of a metal oxide.

4. The method of claim 3, wherein the metal is silver, gold, copper, or nickel, platinum, palladium, chromium, tin, iron, rhodium, iridium, cobalt or any combination thereof.

5. The method of claim 1, wherein heating temperature of the electrically conductive layer of micro- and/or nanostructures is controlled by modifying the amount of voltage applied across the conductive layer or by modifying the amount of a conductive filler present in the substrate.

6. The method of claim 5, wherein the amount of voltage is at least 2 V to 5 V for at least 1 min. to 60 min., wherein heating results in the production of micro- and/or nanostructures having two-dimensional morphology.

7. The method of claim 1, wherein the substrate comprising the precursor material and the electrically conductive layer of micro- or nanostructures embedded into at least a portion of a first surface of the substrate in step (a) is obtained by:
   (i) depositing the micro- or nanostructures on at least a portion of the first surface of the substrate;
   (ii) applying heat to either the first surface or a second surface of the substrate, or both, with at least a first heating source or with at least a first and second heating source such that the micro- or nanostructures or the first surface of the substrate are heated to a temperature that is greater than the glass transition temperature or the Vicat softening temperature of the substrate and less than the melting point of the substrate; and
   (iii) applying a sufficient amount of pressure to either the first surface or the second surface of the substrate, or both, with at least a first pressure source or with a first and second pressure source such that the first surface of the substrate and the micro- or nanostructures are pressed together to form the electrically conductive layer and to embed the micro- or nanostructures into the first surface of the substrate,
   wherein the precursor material is deposited on the micro- or nanostructures or the first surface of the substrate, or both, prior to step (iii) or after step (iii) or both.

8. The method of claim 7, wherein the precursor material is deposited on the micro- or nanostructures or the first surface of the substrate prior to step (ii) or prior to or after step (iii) by chemical vapor deposition, spray coating, ultrasonic spray coating, roll-to-roll coating, ink-jet printing, screen printing, drop casting, spin coating, dip coating, Mayer rod coating, gravure coating, slot die coating, or doctor blade coating of a composition comprising the catalytic precursor material.

9. The method of claim 7, wherein the precursor material is deposited on the micro- or nanostructures or the first surface of the substrate after step (iii) by chemical vapor deposition, metal oxide vapor deposition, plasma deposition techniques, and atomic layer deposition.

10. The method of claim 7, wherein the first surface is not pre-conditioned to increase attachment between the micro- or nanostructures and the substrate in step (i) such that (a) the first surface is not chemically modified or functionalized, (b) the first surface is not physically altered, (c) an adhesive is not used or disposed on the first surface of the substrate, or (d) an initial pressure or heat step prior to simultaneous application of pressure and heat is not performed.

11. The method of claim 1, wherein the precursor material is deposited on the electrically conductive layer at an intersection of at least two micro- or nanostructures of the electrically conductive layer, and wherein (1) the two micro- or nanostructures become welded or attached together during conversion of the precursor material and/or (2) the produced micro- and/or nanostructures from the precursor material are welded or attached to the electrically conductive layer.

12. A supported catalyst comprising the material made by the process of claim 1; wherein the material catalyzes a chemical reaction.

13. A method of catalyzing a chemical reaction, the method comprising chemically reacting reactants in the presence of the supported catalyst of claim 12 under conditions sufficient to produce a product from the reactants.

14. A supported catalyst according to claim 12, the supported catalyst comprising a substrate comprising a catalytic material and an electrically conductive layer of micro- or nanostructures embedded into at least a portion of a first surface of the substrate, wherein the catalytic material is deposited on a surface of the micro- or nanostructures, on a surface of the substrate, or both.

15. The supported catalyst of claim 14, wherein the catalytic material comprises a metal cluster or a metal oxide.

16. The supported catalyst of claim 14, wherein the electrically conductive micro- or nanostructures comprise metal or carbon or are a mixture of metal micro- or nanostructures and carbon micro- or nanostructures.

17. The supported catalyst of claim 14 wherein the supported catalyst is shaped as a film having a first side and an opposing second side, wherein the first side includes the first surface.

18. A material comprising a substrate, an electrically conductive layer of micro- or nanostructures embedded into at least a portion of a first surface of the substrate, and micro- and/or nanostructures in direct contact with a surface of the electrically conductive layer, a surface of the substrate, or both, wherein the material is prepared by the process of claim 1.

19. The material of claim 18, wherein the micro- and/or nanostructures comprise a metal cluster or a metal oxide.

20. An article of manufacture comprising the supported nanostructured material of claim 18, wherein the article of manufacture is an optical film, a plasmonic substrate, a zero Possion's ratio material, a responsive polymer material, a flexible nano-device, a catalytic architecture, a controlled release media, a separation media, a membrane, an energy storage system or device, a sensor device, medicinal or chemical delivery system, a stretchable nano-device, a stretchable sensor, a stretchable battery separator, a stretchable energy harvester, a stretchable piezoelectric devise, a stretchable transistor, a stretchable diode, or a stretchable capacitor.

* * * * *